United States Patent
Bahr et al.

(10) Patent No.: US 10,382,271 B2
(45) Date of Patent: *Aug. 13, 2019

(54) METHOD AND NETWORK NODE DEVICE FOR CONTROLLING THE RUN OF TECHNOLOGY SPECIFIC PUSH-BUTTON CONFIGURATION SESSIONS WITHIN A HETEROGENEOUS OR HOMOGENEOUS WIRELESS NETWORK AND HETEROGENEOUS OR HOMOGENEOUS WIRELESS NETWORK

(71) Applicant: Siemens Aktiengesellschaft, Munich (DE)

(72) Inventors: Michael Bahr, Munich (DE); Rainer Falk, Poing (DE); Parag Mogre, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 318 days.

This patent is subject to a terminal disclaimer.

(21) Appl. No.: 15/030,085

(22) PCT Filed: Oct. 17, 2014

(86) PCT No.: PCT/EP2014/072303
§ 371 (c)(1),
(2) Date: Apr. 18, 2016

(87) PCT Pub. No.: WO2015/055807
PCT Pub. Date: Apr. 23, 2015

(65) Prior Publication Data
US 2016/0269231 A1    Sep. 15, 2016

(30) Foreign Application Priority Data

Oct. 17, 2013 (EP) .................................. 13189177

(51) Int. Cl.
*H04L 12/24* (2006.01)
*H04L 29/06* (2006.01)
(Continued)

(52) U.S. Cl.
CPC ...... *H04L 41/0866* (2013.01); *H04L 12/2803* (2013.01); *H04L 12/2807* (2013.01);
(Continued)

(58) Field of Classification Search
CPC ... H04L 63/08; H04L 63/083; H04L 41/0806; H04L 41/0813; H04L 41/08;
(Continued)

(56) References Cited

U.S. PATENT DOCUMENTS

| 9,025,493 B2* | 5/2015 | Yee | ........................ | H04W 76/02 370/254 |
| 9,363,672 B2* | 6/2016 | Bahr | ..................... | H04W 12/06 |

(Continued)

FOREIGN PATENT DOCUMENTS

| CN | 103024928 A | 4/2013 | ............ H04W 76/02 |
| CN | 103634790 A | 3/2014 | ............ H04W 12/04 |

(Continued)

OTHER PUBLICATIONS

Anonymous, "Wi-Fi Protected Setup Specification Version 1.0," Wifi Alliance, 109 pages, Sep. 2006.
(Continued)

*Primary Examiner* — Ramy M Osman
(74) *Attorney, Agent, or Firm* — Slayden Grubert Beard PLLC

(57) ABSTRACT

A method and network node device are provided for controlling an execution of technology specific Push-Button Configuration sessions within a heterogeneous or homogeneous wireless network, as well as a heterogeneous or homogeneous wireless network for detecting a session over-
(Continued)

lap within the network, whereby the session is related to a configuration session (bootstrapping session, setup session) that establishes a security configuration for encrypted communication over a wireless link. The method and device utilizes an enhanced mechanism for controlling the execution of technology specific Push Button Configuration sessions within a heterogeneous or homogeneous wireless network and a plurality of network node devices interconnected to each other via at least one interface and/or over multiple hops and authenticated or unauthenticated for the network by using a piece of information, e.g. a "Configuration Setup Session Identifier (CSSID)", for identifying a technology specific Push Button Configuration setup session.

22 Claims, 12 Drawing Sheets

(51) Int. Cl.
H04L 12/28 (2006.01)
H04W 84/12 (2009.01)
H04W 12/06 (2009.01)
H04L 29/08 (2006.01)

(52) U.S. Cl.
CPC ...... *H04L 41/0803* (2013.01); *H04L 41/0806* (2013.01); *H04L 41/0873* (2013.01); *H04L 41/28* (2013.01); *H04L 63/08* (2013.01); *H04L 67/141* (2013.01); *H04W 12/06* (2013.01); *H04W 84/12* (2013.01)

(58) Field of Classification Search
CPC ............ H04L 41/0803; H04L 41/0866; H04L 41/0869; H04L 41/0873; H04L 12/2803; H04L 12/2807
See application file for complete search history.

(56) References Cited

U.S. PATENT DOCUMENTS

| 9,444,691 | B2* | 9/2016 | Bahr | H04L 63/08 |
|---|---|---|---|---|
| 9,578,001 | B2* | 2/2017 | Bahr | H04L 41/0813 |
| 9,883,538 | B2* | 1/2018 | Kumar | H04W 12/06 |
| 9,906,409 | B2* | 2/2018 | Bahr | H04L 41/0806 |
| 10,104,056 | B2* | 10/2018 | Bahr | H04L 41/0813 |
| 2008/0089300 | A1* | 4/2008 | Yee | H04W 12/06 370/338 |
| 2011/0176457 | A1* | 7/2011 | Yee | H04W 76/10 370/254 |
| 2013/0089001 | A1* | 4/2013 | Dattagupta | H04W 48/20 370/255 |
| 2014/0337952 | A1* | 11/2014 | Bahr | H04L 63/083 726/7 |
| 2016/0066353 | A1* | 3/2016 | Kumar | H04W 12/06 709/227 |
| 2017/0048226 | A1* | 2/2017 | Bahr | H04L 63/08 |

FOREIGN PATENT DOCUMENTS

| WO | 2013/153171 A1 | 10/2013 | ............ H04L 29/06 |
|---|---|---|---|
| WO | 2015/055807 A1 | 4/2015 | ............ H04L 12/28 |

OTHER PUBLICATIONS

Anonymous, "Wi-Fi Protected Setup Specification Version 1.0h," Wifi Alliance, 110 pages, Dec. 2006.
Anonymous, "IEEE P1905.1, Draft Standard for a Convergent Digital Home Network for Heterogeneous Technologies," Proposal for CDHN Standard, 85 pages, Sep. 27, 2011.
Anonymous, "P1905.1/D02 Draft Standard for Convergent Digital Home Network for Heerogeneous Technologies," IEEE 2011, Piscataway, NJ, URL: http://ieeexplore.ieee.org/stampPDF/getPDF.jsp?tp=&arnumber=6112147, 80 pages, Dec. 14, 2011.
Anonymous, "Wi-Fi Simple Configuration Technical Specification, Version 2.0.2," Wifi Alliance, 154 pages, Jan. 2012.
Anonymous, "IEEE Std 1905.1TM-2013, IEEE Standard for Convergent Digital Home Network for Heterogeneous Technologies," IEEE Standards Association, IEEE Communications Society, 93 pages, Apr. 12, 2013.
International Search Report and Written Opinion, Application No. PCT/EP2014/072303, 12 pages, dated Jan. 5, 2015.

* cited by examiner

METHOD AND NETWORK NODE DEVICE FOR CONTROLLING THE RUN OF TECHNOLOGY SPECIFIC PUSH-BUTTON CONFIGURATION SESSIONS WITHIN A HETEROGENEOUS OR HOMOGENEOUS WIRELESS NETWORK AND HETEROGENEOUS OR HOMOGENEOUS WIRELESS NETWORK

CROSS-REFERENCE TO RELATED APPLICATIONS

This application is a U.S. National Stage application of International Application No. PCT/EP2014/072303 filed Oct. 17, 2014, which designates the United States of America, and claims priority to EP Application No. 13189177.2 filed Oct. 17, 2013, the contents of which are hereby incorporated by reference in their entirety.

TECHNICAL FIELD

The invention relates to a method for controlling the run of technology specific Push Button Configuration sessions within a heterogeneous or homogeneous wireless network, a first network node device for controlling the run of technology specific Push Button Configuration sessions within a heterogeneous or homogeneous wireless network, a second network node device for controlling the run of technology specific Push Button Configuration sessions within a heterogeneous or homogeneous wireless network, a computer readable storage media executable by a processor for controlling the run of technology specific Push Button Configuration sessions within a heterogeneous or homogeneous wireless network, and a heterogeneous or homogeneous wireless network for controlling the run of technology specific Push Button Configuration sessions.

BACKGROUND

The current data-centric use of networks (Internet access, media streaming) is increasingly extended towards home control functionality (home automation for climate control, lighting, burglar alarm, home energy network). Such home networks use according to FIG. 1 for instance various communication network technologies like Ethernet (IEEE 802.3), WLAN/WiFi (IEEE 802.11), and Power Line Communication (PLC; IEEE 1901). For this reason they are heterogeneous. The standard IEEE P1905.1 for Convergent Digital Home Networks (CDHN) [1] defines a home network standard supporting different network technologies by a specified "IEEE P1905.1"-Abstraction Layer.

FIG. 2 shows the design of the abstraction layer based on the ISO/OSI-Reference Model with a management and data plane. The abstraction layer is embedded in an IEEE P1905.1-Architecture above a Media Access Control (MAC)-layer and a Physical layer as part of a "Network Node Device" NND within the heterogeneous network. Thus, the network node device NND uses the cited technologies like Ethernet (IEEE 802.3), WLAN/WiFi (IEEE 802.11), and Power Line Communication (PLC; IEEE 1901) and additionally a technology according to the specification of the Multimedia over Coax Alliance (MoCA) via corresponding interfaces according to FIG. 2. It is not compulsory or mandatory for a typical network node device to support all cited communication technologies. It is possible that the network node device NND supports only one or two of the cited technologies or completely other network technologies. Thus the network node device NND supports at least one network technology.

At least one goal of the IEEE P1905.1 standardization activities are security mechanisms. They are needed to protect the home network from external attacks. Such security mechanisms have to be configured with a security credential (password, passphrase, cryptographic key) that is burdensome to set-up manually.

The specific problem of using a Push-Button Configuration (PBC) in an "IEEE P1905.1"-network comes from the fact that multiple devices (belonging even to different technologies) are activated to accept a new device. So in the current version of the standard, more than one device could register with the "IEEE P1905.1"-network after a single button press. An attacker node may therefore register undetected when an authorized registration of a new device takes place. Further, even in a scenario where there is no attacker node, if multiple existing nodes of the home network (for e.g. access points) activate their technology specific PBC mode simultaneously it may lead to failure of the new node's attempts to join the network. This is specifically the case when the access points (or the nodes involved in registering the new node in the network via the technology specific PBC) are IEEE 802.11 (WLAN) access points supporting as a Push-Button Configuration in the WLAN environment a Wi-Fi Protected Setup (WPS). Taking this into account a technology specific Push-Button Configuration is a Push-Button Configuration, which is used specifically for each of the communication network technologies within the heterogeneous network. In other words the aforementioned PBC and WPS is each a technology specific Push-Button Configuration or belongs each to the technology specific Push-Button Configuration.

Currently in heterogeneous convergent digital home networks for ease of use a push button method is provided in order to allow the end-user to easily setup the security credentials and permit new network devices to join the convergent digital home network. An example for this is the mechanism provided in the IEEE P1905.1 draft standard. Here using the P1905.1 push button mechanism, technology specific push button configurations (PBC) are activated on authenticated devices in the home network. This enables the new device joining to carry out a technology specific PBC itself with a suitable device (based on range, connectivity, and media type) to get security credentials to join the home network.

One of the basic problems with this is, that multiple technology specific push button configurations (PBC) triggered by the same push button event may actually fail because they recognize each other as a conflicting PBC run. This is especially the case in Wi-Fi Protected Setup (WPS) with "Wi-Fi"-devices.

Wireless communication equipment as e.g., a WLAN device has to be configured before it can be used. In particular, a cryptographic key may be required to be configured. An important standard for user-friendly configuration of WLAN devices is Wi-Fi Protected Setup (WPS) that supports a push-button configuration PBC between two devices. However, the general applicability is limited. So there is a need for an improved wireless configuration setup method.

The mechanisms provided however are limited, for example, they do not work for the case of home networks where multiple registrars are present [multiple registrars are possible, see page 16 of the "Wi-Fi Simple Configuration Technical Specification" defined by the Wi-Fi Alliance Version 2.0.2 (Jan. 2012) [2], which is the de-facto standard for WLAN security setup.

The IEEE 1905.1 Standard for Convergent Digital Home Networks [1] generalizes the push button configuration method of Wi-Fi Simple Configuration [2] to heterogeneous communication networks that have potentially multi-hop paths between the nodes. In IEEE 1905.1 [1], the push button on the network-side can be pressed on any device already belonging to the convergent digital home network (CDHN) in order to provide the necessary security credentials for joining the CDHN to the enrollee in a so-called push button configuration (PBC). Nodes in the CDHN use their technology-specific PBC methods, and for Wireless LAN (WLAN) devices, this is the push button configuration as defined in Wi-Fi Protected Setup [2].

The idea of IEEE 1905.1 is to activate the technology-specific PBC method at all nodes of the CDHN if a push button is pressed on a network node. Potentially, more than one WLAN access point will activate its WPS push button configuration method. However, the push button configuration in Wi-Fi Protected Setup will fail, if an enrollee will see more than one access point in PBC mode.

A method is needed to recognize whether multiple, simultaneous technology-specific PBC runs, especially Wi-Fi Protected Setup PBC runs, belong to the same push button event in the CDHN or to different push button events. The latter might be caused by an attacker and should be dealt as session overlap. Furthermore, the means for identifying the same push button event need to be verified so that an attacker cannot simply copy them to its own push button messages. These methods have to work over multiple hops.

The current technical specification for Wi-Fi Simple Configuration with the push button configuration (PBC) method (see [2], especially section 11.3) describes a monitoring for simultaneous push-button configurations. If a session overlap is detected, the push button configuration fails. A session overlap is detected if:

an enrollee discovers more than one registrar in active PBC mode: "if the Enrollee discovers more than one Registrar in active PBC mode then the Enrollee MUST abort its connection attempt and signal a "session overlap" error to the user."([2] page 93)

a registrar receives PBC probe requests from more than one enrollee within the PBC Monitor Time and PBC Walk Time: "Within the PBC Monitor Time, if the Registrar receives PBC probe requests from more than one Enrollee, or if the Registrar receives an M1 message from an Enrollee with a UUID-E that does not match the UUID-E received in a probe request, then the Registrar MUST signal a "session overlap" error."([2], page 94)

FIG. 3 illustrates the components involved in a Push Button Configuration as defined by the Wi-Fi Simple Configuration Protocol [2]: A Registrar R, an Access Point AP, and an Enrollee E. In some cases, these logical components may be co-located, especially an Access Point may include a built-in Registrar to add Enrollees in a standalone fashion.

The standard IEEE P1905.1 [1] defines a 1905.1 Push Button Configuration (PBC) Method for automatic cross-technology security setup (multi-technology push button configuration) in clause 9.2.2. An example of the IEEE 1905.1 PBC Method, as given in [1], is shown in FIG. 4.

If the push button is pressed on any IEEE 1905.1 device already belonging to the IEEE 1905.1 network, then a corresponding push button event is triggered on this IEEE 1905.1 device. The underlying technology-specific push button configuration methods of each of the interfaces of this IEEE 1905.1 device are initiated. Furthermore, a Push Button Event Notification (PBN) Message is distributed to all IEEE 1905.1 devices belonging to the network (1905.1 Devices 2, 3, and 5 in FIG. 4).

The PBN Message contains the following information: MAC address of the transmitting device (=the PBN originator), the media types and corresponding media-specific information for which a PBC configuration has been activated at the PBN originator (=the IEEE 1905.1 device with the push button event).

On receipt of a PBN Message, an IEEE 1905.1 device initializes its underlying technology-specific PBC methods except for IEEE 802.11 interfaces. If the IEEE 802.11 interface belongs to an IEEE 802.11 access point, the underlying Wi-Fi Push Button Configuration is only initialized if the IEEE 802.11 Access Point is configured as the Registrar and the PBN originator did not initialize a Wi-Fi Push Button Configuration.

The IEEE 1905.1 PBC method ensures that only one IEEE 802.11 Access Point will initialize its technology-specific Wi-Fi PBC method at a push button event somewhere in the IEEE 1905.1 network. However, it cannot be ensured in networks with multiple IEEE 802.11 Access Points that the Enrollee will be in reach of the initialized access point even if it is in reach of an access point of the IEEE 1905.1 network.

Wi-Fi Simple Configuration [2] describes message exchanges between Enrollee, Access Point and Registrar for the scenario with an External Registrar and the case "Registrar triggered first" (cf. FIG. 5) as well as the case "Enrollee triggered first" (cf. FIG. 6).

FIGS. 5 and 6 show an example message flow of PBC configurations as specified in Wi-Fi Simple Configuration [2].

FIG. 7 shows an example setting of a convergent digital home network where the Enrollee of the FIGS. 5 and 6 corresponds to a New Device ND and the Access Point corresponds to network node devices D1, D2. The External Registrar functionality corresponds typically to a network node device D-PBE on which the push button is pressed and thus a Push Button Event happened. However, it is also possible in the context of the example setting being related to the invention that the Registrar functionality is realized on a different node (not shown in the FIG. 7) or on the network node device D1 or the network node device D2. In each of these cases the network node device D-PBE would send an information about the Push Button Event to the Registrar, for instance, a "Push Button Notification"-message (PBN-message).

The FIG. 7 shows a failed push button configuration in a convergent digital home network according to the state of the art of Wi-Fi Simple Configuration [2]. Note: The network node device D2 will start a technology-specific PBC and it is multiple hops away from the originator of the Push Button Event, the network node device D-PBE.

The FIG. 7 shows an exemplary signalling flow according to the state of the art. The two network node devices D1, D2 and the node device with the External Registrar functionality D-PBE belong to the same heterogeneous or homogeneous wireless network, e.g., an IEEE P1905.1 network or a single WLAN mesh network according to IEEE 802.11. Although only these three network node devices D1, D2, D-PBE are shown in the FIG. 7 it should be clear that the network can include more than these three devices. This means that besides a first network node device, which corresponds to the node device with the External Registrar functionality D-PBE, the network can have at least one second network node device, in the present case two second network node devices D1, D2.

A Push Button Configuration (initiation of an automatic security bootstrapping) is started, here by a first Push Button Event PBE-1 triggered on a first network node device D-PBE. The push button may be a physical push button activated by a user, a software push button on a user interface activated by a human user, or a logical push button which can be activated, for instance, by a software program. The first network node device D-PBE may in particular realize the role of a Registrar according to Wi-Fi Protected Setup specification.

Two second network node devices D1, D2 belonging to the same network are informed by the first network node device D-PBE by sending a push button notification message PBN to the two second network node devices D1, D2. Of the informed network node devices D1, D2 each network node device start a Push Button Configuration session (PBC session), e.g. a Wi-Fi Protected Setup session (WPS). A new device (third network node device) ND that is to be registered with the network to which the network node devices D-PBE, D1 and D2 belong, starts also a Push Button Configuration by a second Push Button Event PBE-2. A monitoring is performed according to the standard to detect overlapping PBC sessions. As here both network node devices D1 and D2 indicate the status of their started PBC by sending a beacon referring to the network node device D1 respectively D2 and the started PBC, the new device ND detects two simultaneous Push Button Configuration sessions, i.e. a session overlap. Thus the new device ND aborts the PBC session with a failure. The new device ND cannot distinguish this case that is expected to be successful from a case where a different device, e.g. an external device ED (cf. FIG. 9), which belongs to a neighbour or an attacker, is performing a PBC session.

Moreover, also the second network node devices D1, D2 would detect a session overlap if they receive the indication of the active PBC session from each other. This is especially the case, if the second network node devices D1, D2 are Wi-Fi Access Point with co-located Wi-Fi Registrars and the second network node devices D1, D2 are in direct range.

In such a scenario, which is based on the FIG. 7 but only described textually, the second network node devices D1, D2 receive the respective beacons indicating an active PBC session from the second network node device D2 resp. D1. Due to the reception of the beacons indicating an active PBC sessions, the second network node devices D1, D2 know that some other Wi-Fi Access Point is performing a PBC run. This is interpreted as a session overlap according to the state of the art [2] and both, the second network node devices D1, D2, will abort their PBC session although there wouldn't be any harm in doing the PBC session since both the second network node devices D1, D2 belong to the same secure home network.

SUMMARY

One embodiment provides a method for controlling the run of technology specific Push Button Configuration sessions within a heterogeneous or homogeneous wireless network and a plurality of network node devices interconnected to each other via at least one interface and/or over multiple hops and authenticated or unauthenticated for the network, whereby:
(a) an authenticated first network node device is triggered by a first virtual or physical Push Button Event being assigned to the first network node device to send directly or indirectly a notification message notifying about the first Push Button Event to at least one authenticated second network node device,
(b) the at least one second network node device starts a Push Button Configuration,
(c) an unauthenticated third network node device is triggered by a second virtual or physical Push Button Event being assigned to the third network node device to start each itself a technology specific Push Button Configuration,
(d) the first network node device creates a first configuration setup session identifier for identifying a first specific configuration setup session, which is transmitted, especially by the notification message, to the at least one second network node device,
(e) the at least one second network node device sends within the started Push Button Configuration session the received first configuration setup session identifier via at least one wireless message to the third network node device,
(f) the third network node device runs the technology specific Push Button Configuration session with one of the at least one second network node device because of receiving the same configuration setup session identifier from the at least one second network node device.

Another embodiment provides a method for controlling the run of technology specific Push Button Configuration sessions within a heterogeneous or homogeneous wireless network and a plurality of network node devices interconnected to each other via at least one interface and/or over multiple hops and authenticated or unauthenticated for the network, whereby:
(a) an authenticated first network node device is triggered by a first virtual or physical Push Button Event being assigned to the first network node device to send directly or indirectly a notification message notifying about the first Push Button Event to at least one authenticated second network node device,
(b) the at least one second network node device starts a Push Button Configuration,
(c) an unauthenticated third network node device is triggered by a second virtual or physical Push Button Event being assigned to the third network node device to start each itself a technology specific Push Button Configuration,
(d) an unauthenticated external device being not part of the network is triggered by a third virtual or physical Push Button Event being assigned to the external device to start a Push Button Configuration session,
(e) the first network node device creates a first configuration setup session identifier for identifying a first specific configuration setup session, which is transmitted, especially by the notification message, to the at least one second network node device,
(f) the external device creates a second configuration setup session identifier for identifying a second specific configuration setup session,
(g) the at least one second network node device sends within the started Push Button Configuration session the received first configuration setup session identifier via at least one wireless message to the third network node device,
(h) the external device sends within the started Push Button Configuration session the second configuration setup session identifier via at least one wireless message to the third network node device,
(i) the third network node device detecting a session overlap aborts the technology specific Push Button Configuration and runs no technology specific Push Button Configuration session with one of the at least one second network node device and the external device because of receiving the different configuration setup session identifiers from the at least one second network node device respectively the external device.

In one embodiment, the first network node device creates from a value a cryptographic commitment value) as the first configuration setup session identifier for identifying the first specific configuration setup session and to prove the ownership of the identifier after the completion of the technology specific Push Button Configuration session between the one of the at least one network node device and the third network node device; and transmits directly or indirectly, after it receives directly or indirectly from the one of the at least one network node device establishing a cryptographic key during the run of the technology specific Push Button Configuration session with the third network node device a request for the value, the value via an encrypted communication protected by the cryptographic key and via the one of the at least one network node device running the technology specific Push Button Configuration session with the third network node device to the third network node device, which verifies the cryptographic commitment value) respectively the first configuration setup session identifier.

In one embodiment, the first network node device creates from a value, the configuration setup session identifier for a phase 1 and the configuration setup session identifier for a phase 2 based on a "Hash based Message Authentication Code", a key derivation function or a message authentication code such as "Advanced Encryption Standard-Cyber Block Chaining-Message Authentication Code" a first cryptographic commitment value as a Primary-Identifier, which is used instead of the first configuration setup session identifier for identifying the first specific configuration setup session, and a second cryptographic commitment value as a Secondary-Identifier, which is used to prove the knowledge of the value during the run of the technology specific Push Button Configuration session between the one of the at least one network node device and the third network node device; and transmits directly or indirectly, after it receives directly or indirectly from the one of the at least one network node device establishing a cryptographic key during the run of the technology specific Push Button Configuration session with the third network node device a request for the value, the value via an encrypted communication protected by the cryptographic key and via the one of the at least one network node device running the technology specific Push Button Configuration session with the third network node device to the third network node device, which verifies the cryptographic commitment values respectively the Primary-Identifier and the Secondary-Identifier.

In one embodiment, the heterogeneous network is a Convergent Digital Home Network, especially based on the IEEE 1905.1 standardization specification, and whereas the homogeneous network is WLAN/Wi-Fi network based on the IEEE 802.11 standardization specification.

In one embodiment, the first and second configuration setup session identifiers are generated randomly or pseudo-randomly when the technology specific Push Button Configuration is initiated.

In one embodiment, the first and second configuration setup session identifiers are calculated using a derivation function, especially a cryptographic hash function as the Message Digest Algorithm "MD5" or the Secure Hash Algorithms "SHA-1"; "SHA-256", using derivation parameter, like especially the Basic Service Set Identifier "BSSID" and/or the client MAC Service Set Identifier "SSID".

In one embodiment, the first and second configuration setup session identifiers are identical to or derived from an IEEE P1905.1 Push Button Event ID.

In one embodiment, the at least one wireless message is at least one of a beacon message, a probe response message, an "Extensible Authentication Protocol over Local Area Network"-message and an UPnP message and includes an information element or data field for transporting the values and/or identifiers.

Another embodiment provides a first network node device for controlling the run of configuration setup sessions within a heterogeneous or homogeneous wireless network, with a plurality of other network node devices authenticated or unauthenticated for the network, namely at least one authenticated second network device and an unauthenticated third network node device triggered by a virtual or physical Push Button Event being assigned to the third network node device in order to start a technology specific Push Button Configuration, interconnected to each other via at least one interface and/or over multiple hops, being authenticated for the network, comprising:

(a) means for sending/receiving information and/or messages, which are triggered by means for performing a Push Button-Event, send a notification message notifying about a further virtual or physical Push Button Event directly or indirectly to the at least one authenticated second network node device, which subsequently starts each a Push Button Configuration, and (b) means for controlling the run of configuration setup sessions, which are connected with the sending/receiving means and designed such that they create a configuration setup session identifier for identifying a first specific configuration setup session, which is transmitted, especially by the notification message, to the at least one second network node device.

In one embodiment, the means for controlling the run of configuration setup sessions, which are connected with the sending/receiving means and designed such that the controlling means create from a value a cryptographic commitment value) as the first configuration setup session identifier for identifying the first specific configuration setup session and to prove the ownership of the identifier after the completion of the technology specific Push Button Configuration session between the one of the at least one network node device and the third network node device; and the sending/receiving means transmit directly or indirectly, after receiving directly or indirectly from the one of the at least one network node device establishing a cryptographic key during the run of the technology specific Push Button Configuration session with the third network node device a request for the value, the value via an encrypted communication protected by the cryptographic key and via the one of the at least one network node device running the technology specific Push Button Configuration session with the third network node device to the third network node device, which verifies the cryptographic commitment value) respectively the first configuration setup session identifier.

In one embodiment, the means for controlling the run of configuration setup sessions, which are connected with the sending/receiving means and designed such that: the controlling means create from a value, the configuration setup session identifier for a phase 1 and the configuration setup session identifier for a phase 2 based on a "Hash based Message Authentication Code", a key derivation function or a message authentication code such as "Advanced Encryption Standard-Cyber Block Chaining-Message Authentication Code" a first cryptographic commitment value as a Primary-Identifier, which is used instead of the first configuration setup session identifier for identifying the first specific configuration setup session, and a second cryptographic commitment value as a Secondary-Identifier, which is used to prove the knowledge of the value during the run of the technology specific Push Button Configuration session between the one of the at least one network node device and the third network node device; and the sending/receiving means transmit directly or indirectly, after receiving directly or indirectly from the one of the at least one network node device establishing a cryptographic key during the run of the technology specific Push Button Configuration session with the third network node device a request for the value, the value via an encrypted communication protected by the cryptographic key and via the one of the at least one network node device running the technology specific Push Button Configuration session with the third network node device to the third network node device, which verifies the cryptographic commitment values respectively the Primary-Identifier and the Secondary-Identifier.

In one embodiment, the heterogeneous network is a Convergent Digital Home Network, e.g., based on the IEEE 1905.1 standardization specification, and whereas the homogeneous network is WLAN/Wi-Fi network based on the IEEE 802.11 standardization specification.

In one embodiment, the first and second configuration setup session identifiers are generated randomly or pseudo-randomly when the technology specific Push Button Configuration is initiated.

In one embodiment, the first and second configuration setup session identifiers are calculated using a derivation function, especially a cryptographic hash function as the Message Digest Algorithm "MD5" or the Secure Hash Algorithms "SHA-1"; "SHA-256", using derivation parameter, like especially the Basic Service Set Identifier "BSSID" and/or the client MAC Service Set Identifier "SSID".

In one embodiment, the first and second configuration setup session identifiers are identical to or derived from an IEEE P1905.1 Push Button Event ID.

Another embodiment provides a second network node device for controlling the run of technology specific Push Button Configuration sessions of at least one second network node device within a heterogeneous or homogeneous wireless network, with a plurality of further network node devices authenticated or unauthenticated for the network, namely an authenticated first network device and an unauthenticated third network node device triggered by a virtual or physical Push Button Event being assigned to the third network node device in order to start a technology specific Push Button Configuration, interconnected to each other via at least one interface and/or over multiple hops, being authenticated for the network, comprising:

(a) Means for sending/receiving information and/or messages receive directly or indirectly from the first network node device a notification message notifying about a further virtual or physical Push Button Event and a configuration setup session identifier, (b) means for controlling the run of technology specific Push Button Configuration sessions, which are connected with the sending/receiving means and designed such that they start a Push Button Configuration, (b2) send within the started Push Button Configuration session the received configuration setup session identifier via at least one wireless message to the third network node device, so that the third network node device is able to run the technology specific Push Button Configuration session with the at least one second network node device since it receives the same configuration setup session identifier.

Another embodiment provides a second network node device for controlling the run of technology specific Push Button Configuration sessions of at least one second network node device within a heterogeneous or homogeneous wireless network, with a plurality of further network node devices authenticated or unauthenticated for the network or not part of the network, namely an authenticated network device, an unauthenticated third network node device triggered by a virtual or physical Push Button Event being assigned to the third network node device in order to start a technology specific Push Button Configuration and an unauthenticated external device not being part of the network triggered also by a virtual or physical Push Button Event being assigned to the external device in order to start a Push Button Configuration session the external device, creating a configuration setup session identifier for identifying a specific configuration setup session and sending within the started Push Button Configuration session the created identifier via at least one wireless message to the third network node device, interconnected to each other via at least one interface and/or over multiple hops, being authenticated for the network, comprising:

(a) means for sending/receiving information and/or messages receive a notification message notifying about a further virtual or physical Push Button Event directly or indirectly from the first network node device and a further configuration setup session identifier being different from the identifier for identifying a further specific configuration setup session, (b) means for controlling the run of technology specific Push Button Configuration sessions, which are connected with the sending/receiving means and designed such that they start a Push Button Configuration, (b2) send within the started Push Button Configuration session the received configuration setup session identifier via at least one wireless message to the third network node device, so that the third network node device is able due to detecting a session overlap to abort the technology specific Push Button Configuration and to run no technology specific Push Button Configuration session with the at least one second network node device and the external device since it receives the different configuration setup session identifiers.

In one embodiment, the heterogeneous network is a Convergent Digital Home Network, especially based on the IEEE 1905.1 standardization specification, and whereas the homogeneous network is WLAN/Wi-Fi network based on the IEEE 802.11 standardization specification.

In one embodiment, the at least one wireless message is at least one of a beacon message, a probe response message, an "Extensible Authentication Protocol over Local Area Network"-message and a UPnP message and includes an information element or data field for transporting the values and/or identifiers.

Another embodiment provides a computer-readable instructions stored in non-transitory computer readable storage media and executable by a processor for controlling the run of technology specific Push Button Configuration sessions within a heterogeneous or homogeneous wireless network with a plurality of network node devices interconnected to each other via at least one interface and/or over multiple hops and authenticated or unauthenticated for the network, implemented in first and second network node devices as disclosed above and/or the network node device, wherein the computer-readable instructions are executable to perform the method for controlling the run of technology specific Push Button Configuration sessions within a heterogeneous or homogeneous wireless network with a plurality of network node devices interconnected to each other via at least one interface and/or over multiple hops and authenticated or unauthenticated for the network as disclosed above.

Another embodiment provides a heterogeneous or homogeneous wireless network for controlling the run of technology specific Push Button Configuration sessions comprising first and second network node devices as disclosed above and a plurality of other network node devices interconnected to each other via at least one interface and/or over multiple hops and authenticated or unauthenticated for the network, whereby the network is configured to perform the method for controlling the run of technology specific Push Button Configuration sessions as disclosed above.

DETAILED DESCRIPTION

Figure 1:
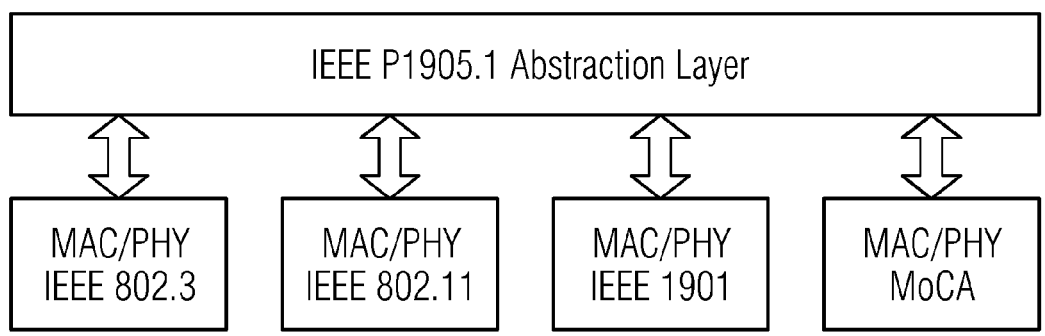
FIG. 1 shows example communication network technologies for a home network, such as Ethernet (IEEE 802.3), WLAN/WiFi (IEEE 802.11), and Power Line Communication (PLC; IEEE 1901).

Embodiments of the invention provide a method and network node device for controlling the run of technology specific Push-Button Configuration sessions within a heterogeneous or homogeneous wireless network as well as a heterogeneous or homogeneous wireless network detecting a session overlap within the network, whereby the session is related to a configuration session (bootstrapping session, setup session) that establishes a security configuration for encrypted communication over a wireless link.

Embodiments of the invention propose an enhanced mechanism for controlling the run of technology specific Push Button Configuration sessions within a heterogeneous or homogeneous wireless network and a plurality of network node devices interconnected to each other via at least one interface and/or over multiple hops and authenticated or unauthenticated for the network by using a piece of information, e.g. a "Configuration Setup Session Identifier (CSSID)", for identifying a technology specific Push Button Configuration setup session.

This enables an automatic setup with session overlap detection being supported with multiple devices. Thus a protected WLAN Setup for Multiple Access Points and not only a point-to-point setup is possible.

A key aspect of embodiments of the invention is the use of a configuration session identifier, CSSID. Each configuration session will receive its (statistically) unique CSSID. Preferably, the CSSID is a random or pseudo-random number or bit string.

Although there is a very small statistical probability of choosing the very same CSSID, we consider the CSSID unique. The relevant messages of the technology-specific push button configuration protocols, especially of the push button configuration method of the Wi-Fi Simple Configuration [2], are extended with the CSSID. So, even if a device receives PBC protocol messages from different devices, for instance, an Enrollee receives Beacons indicating PBC from multiple access points, the device can determine whether the messages belong to the very same configuration session or to different configuration sessions by a comparison of the received CSSIDs.

Let be CSSID_A be the CSSID contained in the PBC messages received from a device A. Let be CSSID_B be the CSSID contained in the PBC messages received from a device B. ==means equality, !=means inequality.

If (CSSID_A==CSSID_B) then both messages belong to the very same configuration session and there is no PBC Session Overlap.

If (CSSID_A !=CSSID_B) then both messages belong to different configuration sessions and this has to be considered as a PBC Session Overlap. The PBC protocol run will be terminated with a failure (Session Overlap). Usually, if CSSID_A and CSSID_B are different, the procedures for a detected PBC Session Overlap are performed. Those procedures are usually the same as already defined in the state of the art, for instance, in the Wi-Fi Simple Configuration [2].

When session overlap detection is performed, in particular as part of a push button configuration, the CSSID information allow to distinguish a single configuration setup session involving several nodes (belonging, however, to a single network) from the case of two different configuration setup sessions. The configuration setup session is aborted if two different setup sessions are detected during the monitoring time frame, i.e. two setup sessions having different CSSID's.

In some embodiments the piece of information, e.g. the Configuration Setup Session Identifier (CSSID), may be generated randomly or pseudo-randomly when a configuration setup session is initiated, e.g. by pressing a button for a push button configuration.

In some embodiments the Configuration Setup Session Identifier (CSSID) is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

In some embodiments the Configuration Setup Session Identifier (CSSID) is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

In some embodiments the Configuration Setup Session Identifier (CSSID) is generated as "commitment" value using a cryptographic one way function (the cryptographic hash function H), e.g. Message Digest Algorithm "MD5" or the Secure Hash Algorithms "SHA-1"; "SHA-256" etc. The Configuration Setup Session Identifier (CSSID) is computed as CSSID:=H(PIP)/H(R), where PIP/R is a parameter/value as described above. The Configuration Setup Session Identifier (CSSID) is used as before, but after completing the configuration setup or at least a part of the configuration setup, the pre-image parameter PIP/the value R is revealed.

The CSSID information may be protected by a cryptographic checksum, e.g. a digital signature. The CSSID information of different nodes may be signed by the same private key, proving that the sending nodes belong to the same network.

This prevents undetected stealing of a CSSID value, as only the entity that determined the CSSID value can reveal the corresponding pre-image parameter PIP. An outsider that intercepted only the CSSID value cannot practically determine the corresponding PIP value. So an attacker (third party) can use a different CSSID, but it cannot use the CSSID selected by another node.

The CSSID value may be determined by the registrar, by the access point, by a push button trigger sending node according to IEEE P1905.1.

In some embodiments the CSSID is included in the messages exchanged over the wireless link, whereas the wireless message could be a beacon message, a probe response message, an "Extensible Authentication Protocol over Local Area Network (EAPoL)"-message or a UPnP message.

Figure 5:
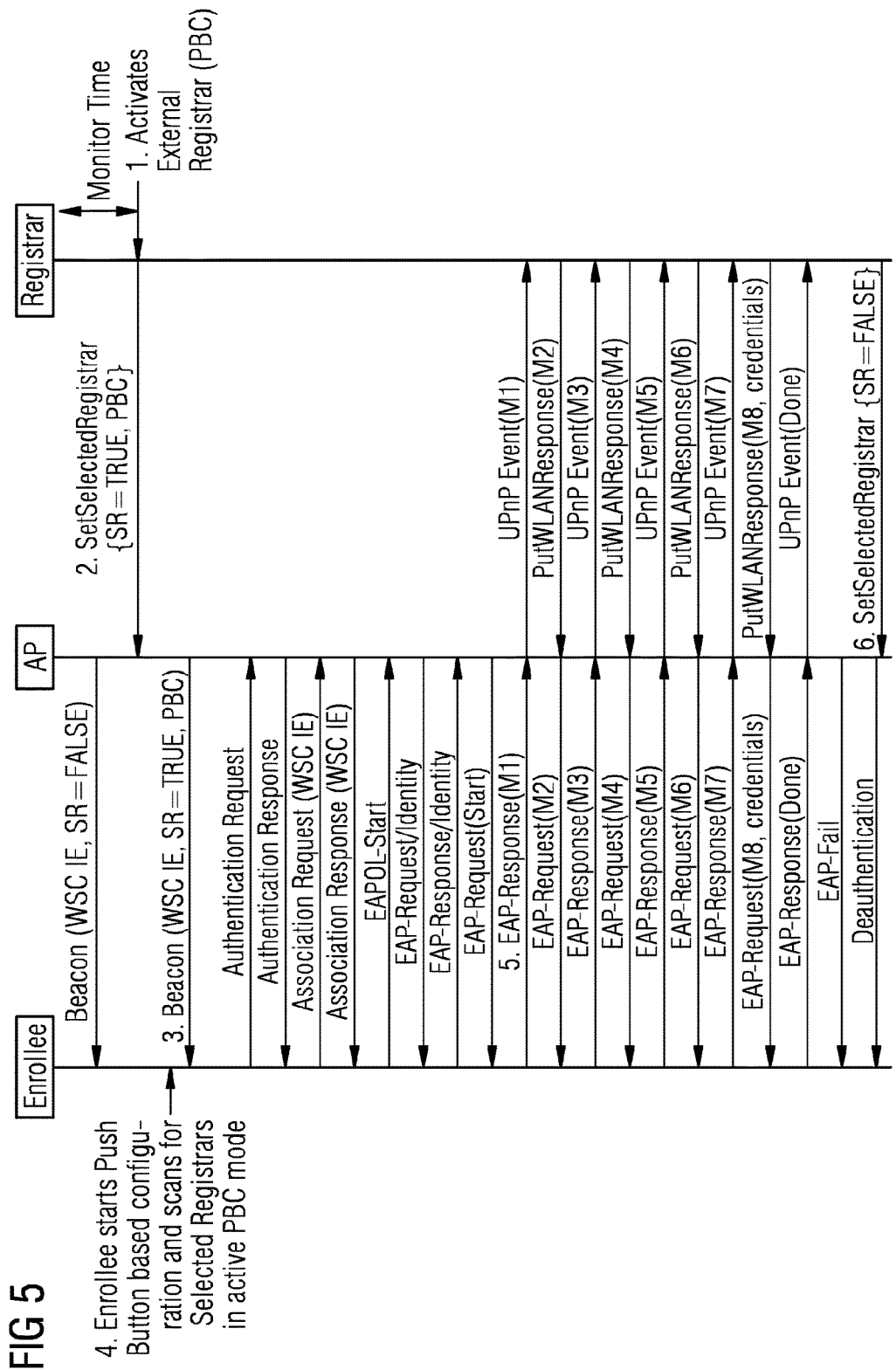
FIG. 5 shows message exchanges between Enrollee, Access Point and Registrar for the scenario with an External Registrar, according to Wi-Fi Simple Configuration [2], and for the case "Registrar triggered first"
Figure 6:
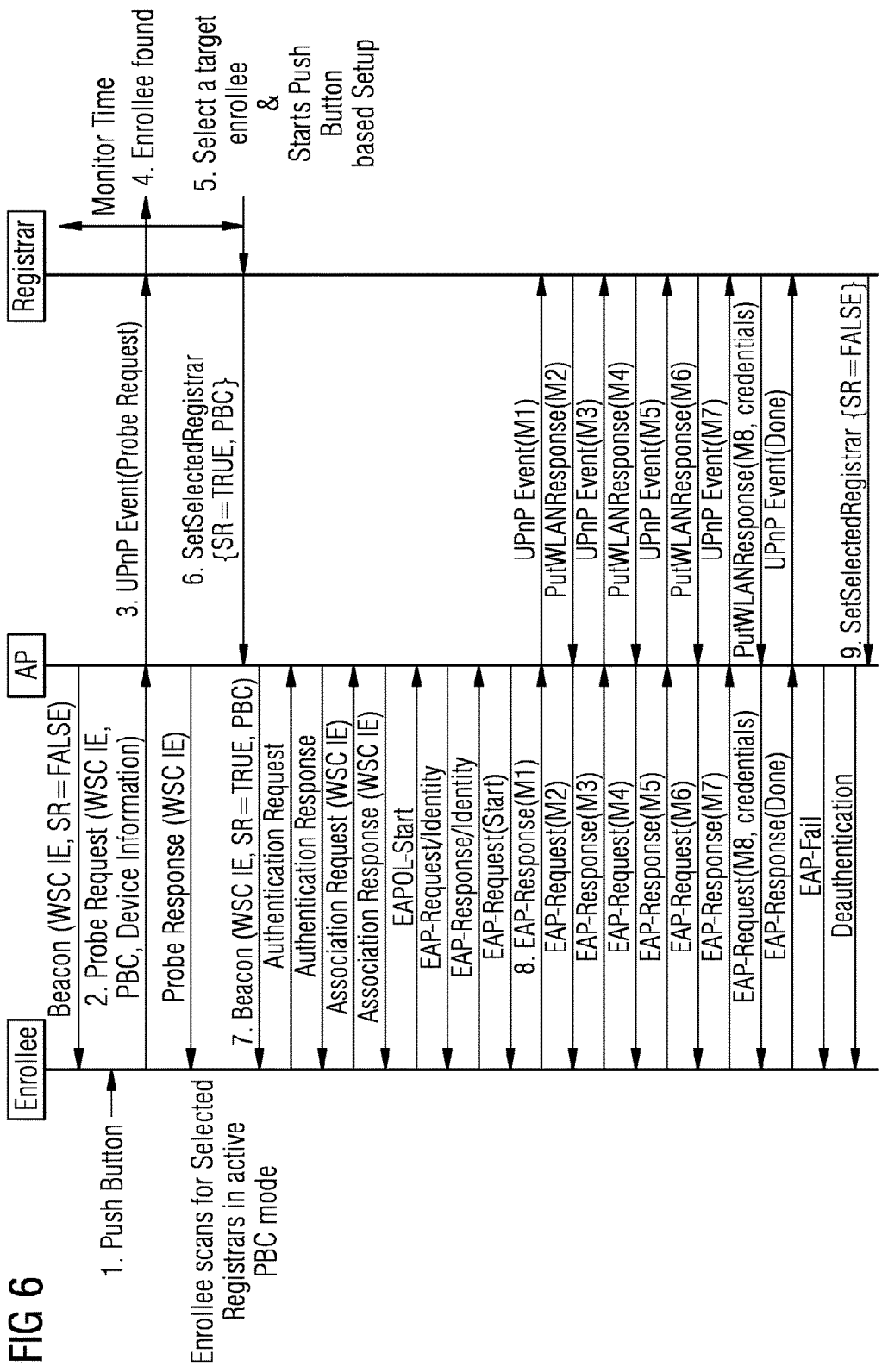
FIG. 6 shows message exchanges between Enrollee, Access Point and Registrar for the scenario with an External Registrar, according to Wi-Fi Simple Configuration [2], and for the case "Enrollee triggered first"

This CSSID value resp. the derived value allows a (new) node that is to be configured to detect whether multiple nodes (e.g., WLAN mesh access points) indicate a single configuration setup session (i.e. no overlap) or different setup sessions. The CSSID value and/or a derived value are included in wireless messages. It may be included in particular as in information element (data field), e.g. the "Wi-Fi Simple Config" information element (WSC IE). It may be included also in one or several of the messages M1, M2, M3, M4, M5, M6, M7, M8 (cf. FIGS. 5 and 6).

Further advantages of the present invention arise out of the following description of example embodiments of the invention.

The details of the invention as well as extensions, variants, and alternative means and methods are described with the help of examples in the corresponding Figures in the following paragraphs (Embodiments Of The Invention).

The embodiments of the invention together with its extensions, variants and alternatives provides means and methods
  to apply the invention in networks where the communication can be over multiple hops, especially, the device generating the CSSID and the device performing the technology specific PBC run and using the CSSID are not directly connected. Instead, they can communicate over multiple communication hops of the secure home network.
  for additional verification of the CSSID.

The embodiments of the invention and its variants and extensions provide a general method for the detection of session overlaps. This method does avoid false alarms that are caused by parallel technology specific PBC runs triggered by the very same push button event in a multi-hop convergent digital home network.

Due to the correct determination whether a (technology-specific) session overlap is really a PBC configuration overlap or only multiple technology-specific runs triggered by the same configuration session (i.e. triggered by the same push button event), there is no need anymore for special methods that would restrict certain devices, especially Wi-Fi Access Points, from starting a technology-specific PBC session (e.g. "Wi-Fi Simple Configuration PBC (WSC PBC)"). Since all Wi-Fi Access Points can start their technology-specific PBC run with the invention, a new Wi-Fi device will be authenticated for the secure home network if it is in range of any Wi-Fi Access Point of this secure home network. The situation of the state of the art in standard P1905.1, where the Access Point in range of the new device might not be allowed to start the PBC run and the new device cannot authenticate, will not happen with the embodiments of the invention.

Due to the successful authentication of new devices through a push button configuration in all cases where no real session overlap exists, user satisfaction is increased with the invention.

Due to the general nature of the invention, it provides a future-proof solution to a problem of the Wi-Fi Simple Configuration Specification with Wi-Fi Access Points being in range with each other or with multiple Wi-Fi Access Points being in range with the Enrollee and those Wi-Fi Access Points being triggered by the very same Push Button Event, that is, their PBC runs belong to the very same configuration session.

Variants and extensions provide means and methods for increased security and trust of the push button configuration session.

Figure 7:
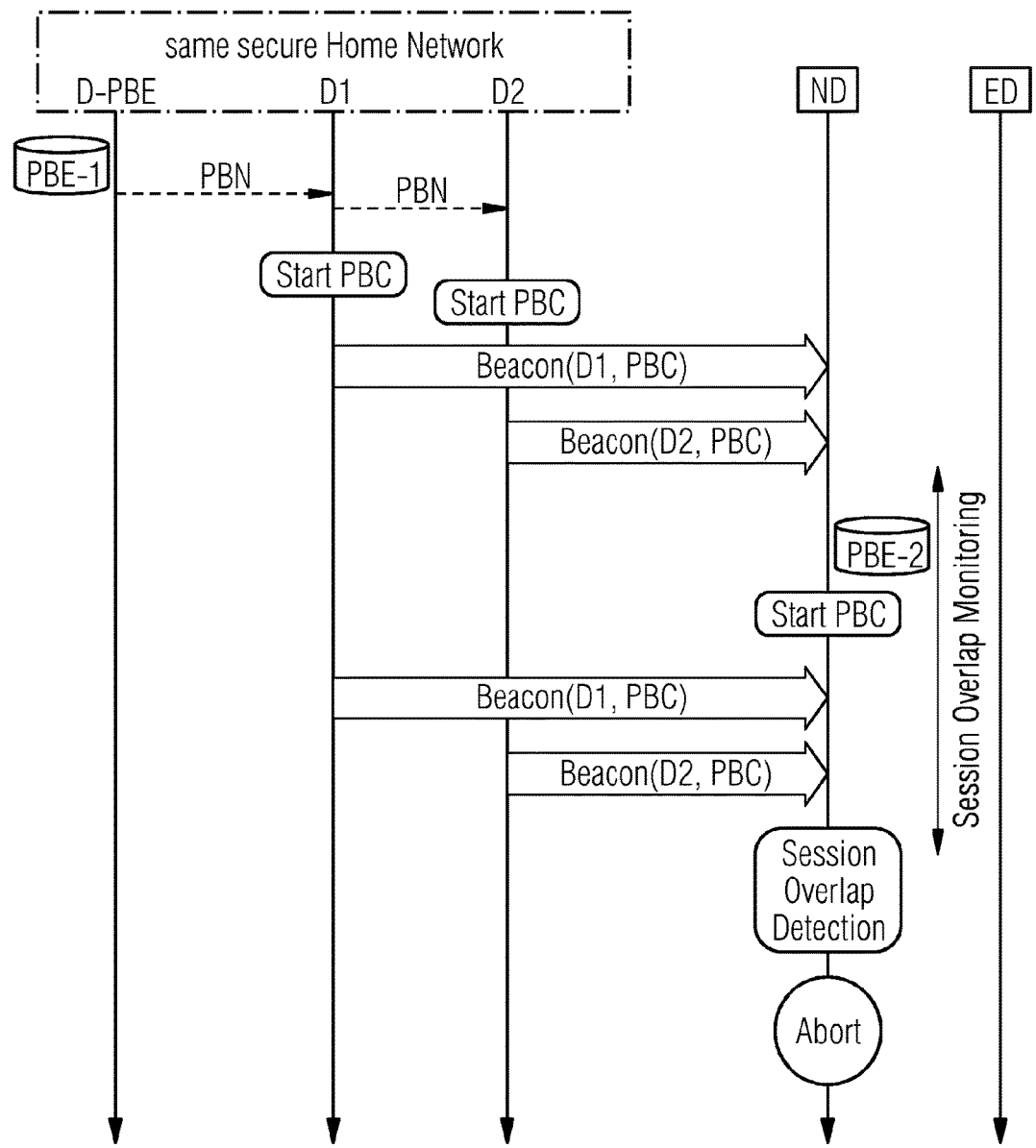
FIG. 7 shows an example setting of a convergent digital home network where the Enrollee of FIGS. 5 and 6 corresponds to a New Device ND and the Access Point corresponds to network node devices.

Embodiments of the invention use an explicit Configuration Setup Session Identifier (CSSID) that solves the problem shown in FIG. 7. Based on a comparison of the CSSIDs of received Beacons (or Probe Responses) the devices being involved in the PBC can determine whether these Beacons (or Probe Responses) belong to the same push button event or to different push button events.

Embodiments of the invention allows for the multi-hop case. Here, the push button is pressed and a Push Button Event Notification message is generated at a separate component that is not running a technology-specific PBC, especially not running a Wi-Fi Simple Configuration push button configuration. See FIG. 7 for an example of such a multi-hop case. The multi-hop case is more challenging than the case where the network node device D1, that is running WLAN itself, generates and provides a Configuration Setup Session Identifier (cf. International Application No. PCT/EP2013/057615). The multi-hop case requires additional methods that deal with the multi-hop communication between the network node devices D-PBE, D1, D2.

The first network node device D-PBE may be, for example, a remote control unit, a wall-mounted home automation control unit, a tablet PC, or a smart phone that is used within the home network. Access to the push button may be protected physically (e.g., the push button is accessible only after removing a cover of the housing of the first network node device D-PBE), or logically (the user has to enter a password or a PIN number before the push button is set to active mode in which the button can be pressed and a PBN message is sent). It may also be possible that a push button event is triggered automatically without explicit user interaction of pressing a physical or logical button. For example, a service mode may be activated on the first network node device D-PBE (service mode access).

The PBN event message includes preferably a time stamp and a cryptographic checksum computed by the first network nod device D-PBE. The receiving second network node device D1, D2 verifies the time stamp and the checksum before accepting the received PBN event message as valid.

Example embodiments of the present invention will be described according to FIGS. 8 to 12.

Figure 8:
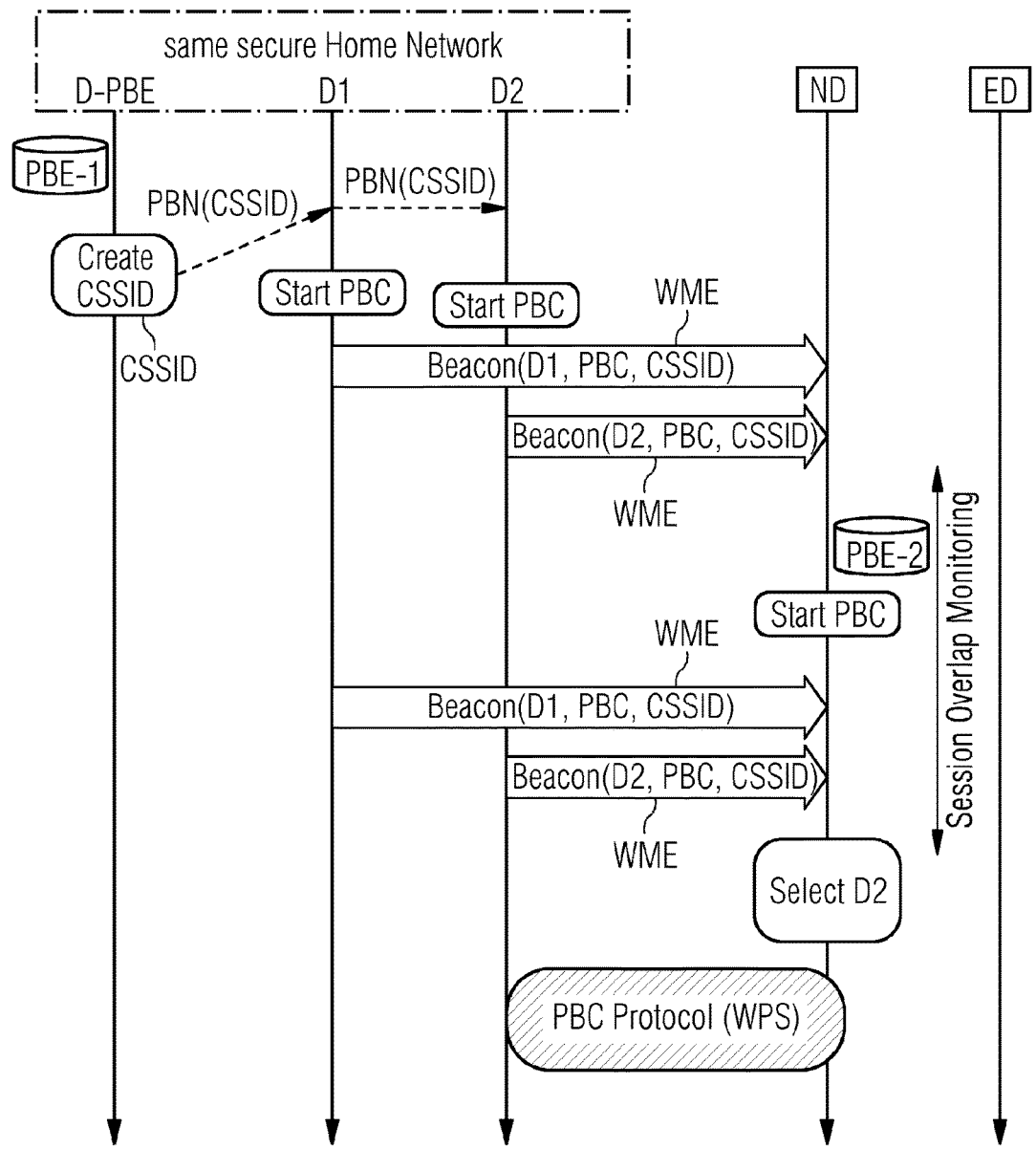
FIG. 8 shows a sequence diagram with the message flow (signalling flow) with a successful registration of a new device despite reception of multiple PBC indications, according to an embodiment of the invention, FIG. 9 based on the FIG. 7 a sequence diagram with the message flow (signalling flow) for detecting an overlap of PBC sessions with an abortion of running PBC sessions, according to an embodiment of the invention, FIG. 10 a sequence diagram with a modified message flow (signalling flow) with a successful registration of a new device despite reception of multiple PBC indications improving the controlling of running technology specific Push Button Configuration sessions shown in the FIG. 8, according to an embodiment of the invention, FIG. 11 a sequence diagram with a further modified message flow (signalling flow) with a successful registration of a new device despite reception of multiple PBC indications further improving the controlling of running technology specific Push Button Configuration sessions shown in the FIG. 8, according to an embodiment of the invention, FIG. 12 the structure of a network node device for controlling the run of technology specific Push Button Configuration sessions within a heterogeneous or homogeneous wireless network based on the abstraction layer embedded in the IEEE P1905.1-Architecture above the Media Access Control (MAC)-layer and the Physical layer shown in FIG. 2, according to an embodiment of the invention.

FIG. 8 shows an exemplary signalling flow according to an example embodiment of the invention using a first Configuration Setup Session Identifier CSSID that identifies a push button configuration setting session.

As in the FIG. 7 the two network node devices D1, D2 and the node device with the External Registrar functionality D-PBE belong to the same heterogeneous or homogeneous wireless network, e.g., an IEEE P1905.1 network or a single WLAN mesh network according to IEEE 802.11. Although again only these three network node devices D1, D2, D-PBE are shown in the FIG. 8 it should be clear that the network can include more than these three devices. This means that besides a first network node device, which corresponds to the node device with the External Registrar functionality D-PBE, the network can have at least one second network node device, in the present case two second network node devices D1, D2.

Again the Push Button Configuration (initiation of an automatic security bootstrapping) is started, here by the first Push Button Event PBE-1 triggered on the first network node device D-PBE. The push button may be again a physical push button activated by a user, a software push button on a user interface activated by a human user, or a logical push button which can be activated, for instance, by a software program. The first network node device D-PBE may again in particular realize the role of a Registrar according to Wi-Fi Protected Setup specification.

In contrast to the FIG. 7 the first network node device D-PBE creates the first Configuration Setup Session Identifier CSSID. The first Configuration Setup Session Identifier CSSID, is preferably generated randomly or pseudo-randomly, when the configuration setup session is initiated by pressing a button for a Push Button Configuration. The first Configuration Setup Session Identifier CSSID may be, for example, a bit string of length 64 bit, 128 bit, or 256 bit.

It is also possible that the first Configuration Setup Session Identifier CSSID is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the first Configuration Setup Session Identifier CSSID is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

Again in accordance to the FIG. 7 the second network node devices D1, D2 belonging to the same network are informed by the first network node device D-PBE by sending the push button notification message PBN to the second network node devices D1, D2. However, different to the situation in the FIG. 7 the push button notification message PBN transports the first Configuration Setup Session Identifier CSSID. In other words: The first Configuration Setup Session Identifier CSSID is distributed through the PBN messages to all network node devices D1, D2 of the secure home network.

The first Configuration Setup Session Identifier CSSID might be distributed from the first network node device D-PBE to the second network node devices D1, D2 with any kind of message as long as there is the connection between configuration setup session started by the push button event PBE and the first Configuration Setup Session Identifier CSSID uniquely available.

Furthermore, the first network node device D-PBE and the second network node device D1 or D2 might be a single device in real networks. This is a special case of the invention also covered by the general description with a separate first network node device D-PBE and separate second network node devices D1, D2.

Of the informed network node devices D1, D2, which receive the PBN message with the first Configuration Setup Session Identifier CSSID indicated by PBN(CSSID), again each network node device start a Push Button Configuration session (PBC session), e.g. a Wi-Fi Protected Setup session (WPS).

Once more as in the FIG. 7 a new device (third network node device) ND that is to be registered with the network, to which the network node devices D-PBE, D1, D2 belong, starts the Push Button Configuration by the second Push Button Event PBE-2. A monitoring is performed according to the standard to detect overlapping PBC sessions.

Now both second network node devices D1, D2 indicate the status of their started PBC by sending messages over a wireless link, called as wireless messages WME. The first Configuration Setup Session Identifier CSSID is included in the wireless message WME. The wireless message WME could be a beacon message, a probe response message, an "Extensible Authentication Protocol over Local Area Network (EAPoL)"-message or a UPnP message, which each also refers to the network node device D1 respectively D2 and the started PBC.

The new device ND detects again two simultaneous Push Button Configuration sessions, i.e. a session overlap, but due to the fact that the first Configuration Setup Session Identifier CSSID, which is sent with wireless message WME each by the network node devices D1, D2 having different MAC addresses and including the same or a different Service Set Identifier "SSID" (network name), is the same (the new device ND verifies whether the CSSID value included in the message of the network node device D1 is identical to the CSSID value in the message of the network node device D2), the new device ND doesn't abort the PBC sessions.

However, if the CSSID value included in the message of the network node device D1 is different from the CSSID value included in the message of the network node device D2, a PBC Session Overlap is detected.

The general rule is: If all messages indicating an active PBC session that are received by the new device ND contain the same CSSID value, then there is no session overlap. If there are different CSSID values contained in those messages, then there is a session overlap detected.

Moreover, also the second network node devices D1, D2 can correctly detect a PBC session overlap according to one further embodiment of the invention. In such a scenario, which is based on FIG. 8 but only described textually, the second network node devices D1, D2 receive the respective beacons indicating an active PBC session and containing the first Configuration Setup Session Identifier CSSID from the second network node device D2 resp. D1. On reception of such a beacon, the second network node device D1 (as well as the second network node device D2, respectively) will compare the first Configuration Setup Session Identifier CSSID contained in the beacon with the first Configuration Setup Session Identifier CSSID of its own active PBC session, if there is a PBC session active at the second network node device D1. If the first Configuration Setup Session Identifiers CSSID are the same, there is no session overlap even if there is another Wi-Fi Access Point indicating an active PBC run. The technology specific PBC run is continued and not aborted. If the received first Configuration Setup Session Identifier CSSID however is different from the first Configuration Setup Session Identifier CSSID of the own PBC session, then there is a session overlap detected and the technology-specific PBC run is aborted. Preferably, this abortion of the PBC run should be distributed to other nodes in the home network so that they can take corresponding action (e.g. aborting their own PBC runs).

The general rule is: If a message indicating an active PBC session, that is received by a Wi-Fi Access Point (the second network node device D1 or D2), contains the same first Configuration Setup Session Identifier CSSID as the first Configuration Setup Session Identifier CSSID of the active PBC session at the receiving Access Point, then there is no session overlap. If the first Configuration Setup Session Identifier CSSID contained in those messages is different from the first Configuration Setup Session Identifier CSSID of the active PBC session at the receiving Access Point, then there is a session overlap detected.

In the example shown in FIG. 8, the first Configuration Setup Session Identifier CSSID is generated by the first network node device D-PBE and provided to the second network node devices D1, D2. The first Configuration Setup Session Identifier CSSID may be provided by multiple unicast messages to all WLAN Access Points of the home network (here: the second network node devices D1, D2), or to a selected subset of Access Points. For example, the user may configure a subset of Access Points that are put in a "Wi-Fi Simple Configuration PBC (WSC PBC)"-mode after a push button key press on the first network node device D-PBE. It is also possible to provide the CSSID information as part of a broadcast message, a multicast message, or any cast message. In a specific variant, the CSSID information is provided as part of a UPnP message, in particular as parameter of a "SetSelectedRegistrar"-message.

In a different variant (not shown), the CSSID may be generated and provided by a separate registrar component on the receipt of a "Push Button Event Notification (PBN)"-message. This separate Registrar component might be a Wi-Fi Access Point or not. For example, the second network node device D1 may realize the Registrar functionality. Then, after receiving the push button event notification from the first network node devices D-PBE, the Registrar functionality of the second network node device D1 will create the CSSID value and provide it to other second network node device D2 (and to itself since the second network node device D1 is a Wi-Fi Access Point).

The PBC protocol run [PBC protocol/"Wi-Fi Simple Configuration PBC (WSC PBC)"] may be performed by the second network node device D2 directly. This would mean in "Wi-Fi Simple Config (WSC)" that the second network node device D2 acts as Registrar. After having finished the protocol run, the second network node device D2 and the new device ND have established a network configuration including cryptographic configuration data.

Furthermore (not shown), the second network node device D2 provides this configuration to all or a subset of network node devices of the home network (e.g. D1, D-PBE) so that the same configuration information is available on these nodes.

In a further different variant, the first network node devices D-PBE acts as Registrar. In this case, the second network node device D2 forwards messages of the PBC protocol between the first network node devices D-PBE (Registrar) and the new device ND (Enrollee). The first network node device D-PBE that is acting as Registrar may provide the established configuration information to the second network node device D2 and/or the second network node device D1 after the PBC protocol run or already during the PBC protocol run. This allows the new device ND to establish a connection with the second network node device D2 and/or the second network node device D1 after the PBC protocol run has finished.

But now back to the FIG. 8, instead of aborting the PBC sessions the new device ND is running a technology specific Push Button Configuration session, e.g. a WPS session, with one of the second network node devices D1, D2. According to the FIG. 8 and the selection of the second network node device D2 it runs the PBC session with the second network node device D2.

Figure 9:
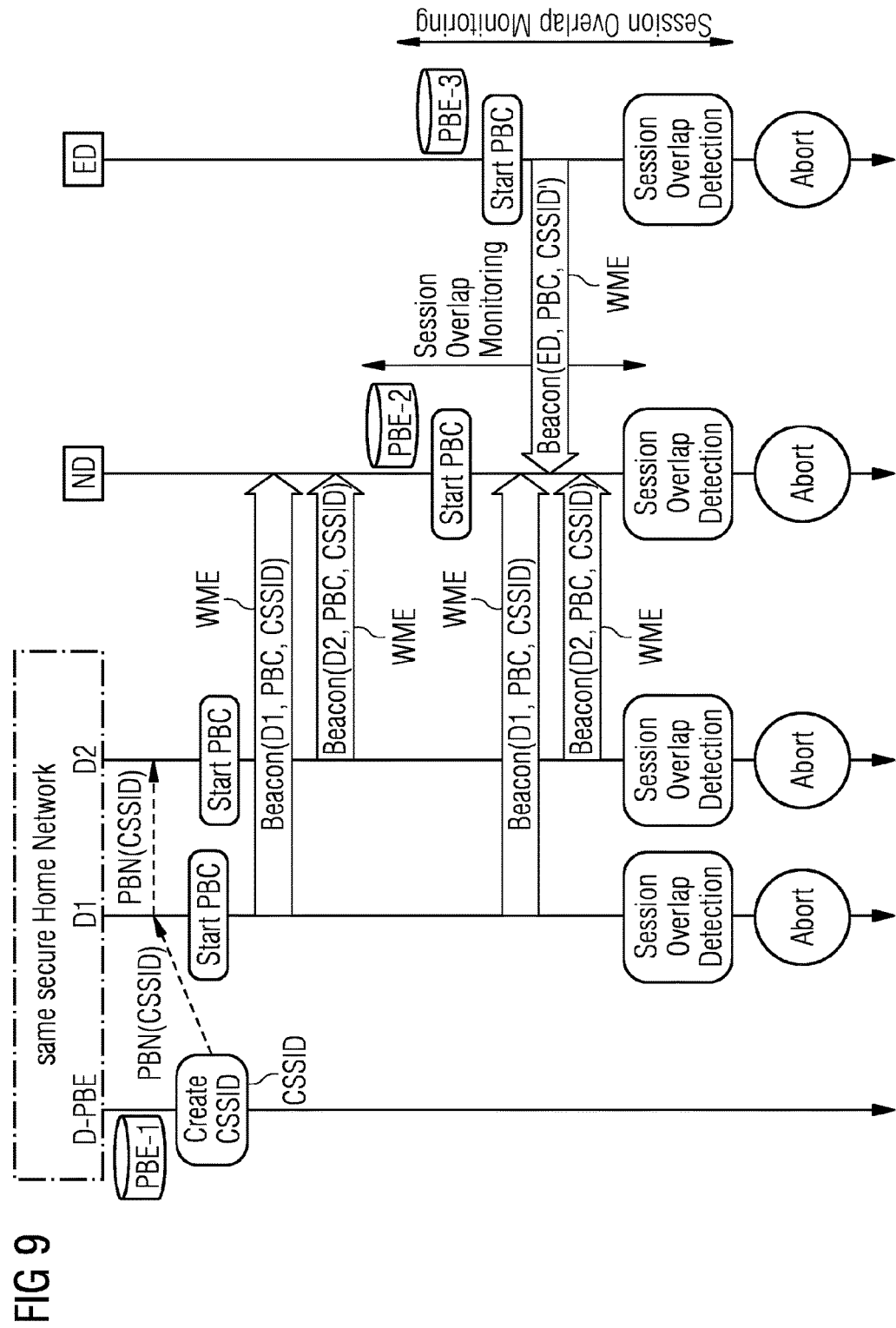

FIG. 9 shows based on the scenario shown in the FIG. 8 an exemplary signalling flow according to one embodiment of the invention detecting an overlap of PBC sessions with an abortion of running PBC sessions by means of the Configuration Setup Session Identifier mechanism. All the general remarks made by describing the FIG. 8, unless they are not mentioned explicitly in the following description of the FIG. 9, are also valid for the description of the FIG. 9.

As in the FIG. 8 the two network node devices D1, D2 and the node device with the External Registrar functionality D-PBE belong to the same heterogeneous or homogeneous wireless network, e.g., an IEEE P1905.1 network or a single WLAN mesh network according to IEEE 802.11. Although again only these three network node devices D1, D2, D-PBE are shown in the FIG. 9 it should be clear that the network can include more than these three devices. This means that besides a first network node device, which corresponds to the node device with the External Registrar functionality D-PBE, the network can have at least one second network node device, in the present case two second network node devices D1, D2.

Again the Push Button Configuration (initiation of an automatic security bootstrapping) is started, here by the first Push Button Event PBE-1 triggered on the first network node device D-PBE. The push button may be again a physical push button activated by a user, a software push button on a user interface activated by a human user, or a logical push button which can be activated, for instance, by a software program. The first network node device D-PBE may again in particular realize the role of a Registrar according to Wi-Fi Protected Setup specification.

As in the FIG. 8 the first network node device D-PBE creates the first Configuration Setup Session Identifier CSSID. The first Configuration Setup Session Identifier CSSID, is preferably generated randomly or pseudo-randomly, when the configuration setup session is initiated by pressing a button for a Push Button Configuration. The first Configuration Setup Session Identifier CSSID may be, for example, a bit string of length 64 bit, 128 bit, or 256 bit.

It is also possible that the first Configuration Setup Session Identifier CSSID is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the first Configuration Setup Session Identifier CSSID is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

The second network node devices D1, D2 again belonging to the same network are informed by the first network node device D-PBE by sending the push button notification message PBN to the second network node devices D1, D2. The push button notification message PBN transports the first Configuration Setup Session Identifier CSSID. In other words: The first Configuration Setup Session Identifier CSSID is distributed through the PBN messages to all network node devices D1, D2 of the secure home network.

The first Configuration Setup Session Identifier CSSID might be distributed from the first network node device D-PBE to the second network node devices D1, D2 with any kind of message as long as there is the connection between configuration setup session started by the push button event PBE and the first Configuration Setup Session Identifier CSSID uniquely available.

Furthermore, the first network node device D-PBE and the second network node device D1 or D2 might be a single device in real networks. This is a special case of the invention also covered by the general description with a separate first network node device D-PBE and separate second network node devices D1, D2.

Of the informed network node devices D1, D2, which receive the PBN message with the first Configuration Setup Session Identifier CSSID indicated by PBN(CSSID), again each network node device start a Push Button Configuration session (PBC session), e.g. a Wi-Fi Protected Setup session (WPS).

The new device (third network node device) ND that is to be registered with the network, to which the network node devices D-PBE, D1, D2 belong, starts the Push Button Configuration by the second Push Button Event PBE-2. A monitoring is performed according to the standard to detect overlapping PBC sessions.

Now both second network node devices D1, D2 indicate the status of their started PBC by sending messages over a wireless link, called as wireless messages WME. The first Configuration Setup Session Identifier CSSID is included in the wireless message WME. The wireless message WME could be a beacon message, a probe response message, an "Extensible Authentication Protocol over Local Area Network (EAPoL)"-message or a UPnP message, which each also refers to the network node device D1 respectively D2 and the started PBC.

The new device ND detects again two simultaneous Push Button Configuration sessions, i.e. a session overlap, but due to the fact that the first Configuration Setup Session Identifier CSSID, which is sent with wireless message WME each by the network node devices D1, D2 having different MAC addresses and including the same or a different Service Set Identifier "SSID" (network name), is the same (the new device ND verifies whether the CSSID value included in the message of the network node device D1 is identical to the CSSID value in the message of the network node device D2), the new device ND would not abort the PBC sessions.

However, during the running time the aforementioned scenario happened, an external device ED, which e.g. belongs to a neighbour or an attacker, is performing a PBC session, too. It means that on the external device ED, triggered by a third Push Button Event PBE-3, a Push Button Configuration (initiation of an automatic security bootstrapping) is started.

As well as the first network node device D-PBE the external device ED creates a Configuration Setup Session Identifier, but it is different from the first Configuration Setup Session Identifier CSSID, because the external device does not belong to the heterogeneous or homogeneous wireless network and thus does not receive the push button notification message PBN. For this reason the identifier created by the external device ED is named as second Configuration Setup Session Identifier CSSID'.

The second Configuration Setup Session Identifier CSSID', is preferably generated randomly or pseudo-randomly, when the configuration setup session is initiated by pressing a button for a Push Button Configuration. The first Configuration Setup Session Identifier CSSID may be, for example, a bit string of length 64 bit, 128 bit, or 256 bit.

It is also possible that the second Configuration Setup Session Identifier CSSID' is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the second Configuration Setup Session Identifier CSSID' is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

Now the external device ED indicate the status of its started PBC by sending messages over a wireless link, called as wireless messages WME. The second Configuration Setup Session Identifier CSSID' is included in the wireless message WME. The wireless message WME could be a beacon message, a probe response message, an "Extensible Authentication Protocol over Local Area Network (EAPoL)"-message or a UPnP message, which each also refers to the external device ED and the started PBC.

Since the new device ND receives now besides the two messages WME with the first Configuration Setup Session Identifier CSSID from the second network node devices D1, D2 a further message WME with the second Configuration Setup Session Identifier CSSID' from the external device ED, it detects due to the different identifiers an overlap of PBC sessions. For this reason it aborts the PBC sessions and thus it runs no technology specific Push Button Configuration session with one of the first network node device D1, the second network node device D2 and the external device ED.

The FIG. 9 shows the case where the external device ED, that is not part of the home network, tries to perform a push button session in parallel. The external device ED generates a CSSID' randomly. With high probability, the values of CSSID and of CSSID' are different. By comparing the CSSID, CSSID' values received from different nodes running push button configuration, the new device ND determines that two different sessions are ongoing (session overlap). The push button session is aborted. Under the assumption that the devices D1, D2, and ED can receive the beacons from each other (reception of those beacons not shown in the FIG. 9), the same check of the Configuration Session Identifiers CSSID, CSSID' is performed by the devices ED, D1, and D2 as well, so all these devices abort the PBC mode.

It may be the case that not all messages of the devices D1, D2, ND, ED can be received by each other device of the devices D1, D2, ND, ED (e.g., due to too far distance). To cope with this situation, any node of the same (home) network may send an information message indicating session overlap to other nodes of this network. So the device D2 may, for instance, send a session overlap indication message to the device D1.

As an extension the session overlap indication message contains the two different configuration session identifiers CSSID, CSSID' that resulted in the detection of the session overlap.

Figure 10:
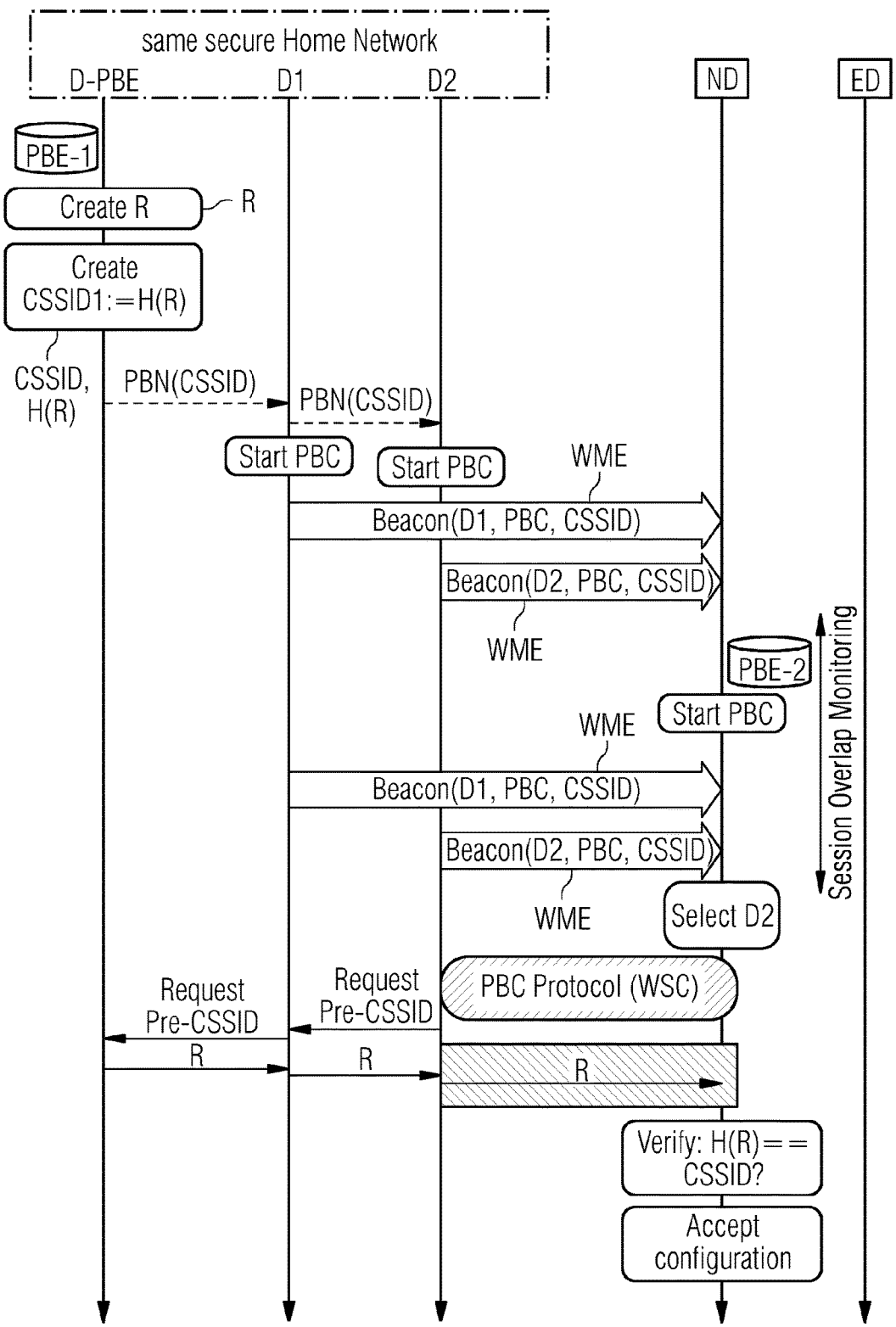

FIG. 10 shows based on the FIG. 8 a modified message flow (signalling flow) with a successful registration of a new device despite reception of multiple PBC indications improving the controlling of running technology specific Push Button Configuration sessions. All the general remarks made by describing the FIG. 8, unless they are not mentioned explicitly in the following description of the FIG. 10, are also valid for the description of the FIG. 10.

The improvement entails in that according to FIG. 10 the network node device using a Configuration Setup Session Identifier must prove to be the "owner" of the ID after having completed the configuration session setup. This can be done be using a cryptographic commitment value as Configuration Setup Session Identifier. After a cryptographic key has been established by the PBC protocol (WPS), the authorized usage of the CSSID value has to be committed by revealing a value R to the new device. The value of R is sent to the new device ND over the encrypted communication protected by the newly established key. This ensures that the value R is received only by the device ND.

In a variant, there are specific time ranges for PBC protocol run and for providing the value R. The protocol succeeds only successfully when starting, e.g. from PBC trigger of PBC protocol run, when the expected information is exchanged during the envisaged period.

As in the FIG. 8 the two network node devices D1, D2 and the node device with the External Registrar functionality D-PBE belong to the same heterogeneous or homogeneous wireless network, e.g., an IEEE P1905.1 network or a single WLAN mesh network according to IEEE 802.11. Although again only these three network node devices D1, D2, D-PBE are shown in the FIG. 10 it should be clear that the network can include more than these three devices. This means that besides a first network node device, which corresponds to the node device with the External Registrar functionality D-PBE, the network can have at least one second network node device, in the present case two second network node devices D1, D2.

Again the Push Button Configuration (initiation of an automatic security bootstrapping) is started, here by the first Push Button Event PBE-1 triggered on the first network node device D-PBE. The push button may be again a physical push button activated by a user, a software push button on a user interface activated by a human user, or a logical push button which can be activated, for instance, by a software program. The first network node device D-PBE may again in particular realize the role of a Registrar according to Wi-Fi Protected Setup specification.

The first network node device D-PBE creates from the value R a cryptographic commitment value H(R) as the first configuration setup session identifier CSSID, using a cryptographic one way function (the cryptographic hash function H), e.g. Message Digest Algorithm "MD5" or the Secure Hash Algorithms "SHA-1"; "SHA-256" etc. The Configuration Setup Session Identifier CSSID is computed as CSSID:=H(R), where R is a value.

The value R is preferably generated randomly or pseudo-randomly when the configuration setup session is initiated by pressing a button for a Push Button Configuration.

The second network node devices D1, D2 again belonging to the same network are informed by the first network node device D-PBE by sending the push button notification message PBN to the second network node devices D1, D2. The push button notification message PBN transports the first Configuration Setup Session Identifier CSSID. In other words: The first Configuration Setup Session Identifier CSSID is distributed through the PBN messages to all network node devices D1, D2 of the secure home network.

The first Configuration Setup Session Identifier CSSID might be distributed from the first network node device D-PBE to the second network node devices D1, D2 with any kind of message as long as there is the connection between configuration setup session started by the push button event PBE and the first Configuration Setup Session Identifier CSSID uniquely available.

Furthermore, the first network node device D-PBE and the second network node device D1 or D2 might be a single device in real networks. This is a special case of the invention also covered by the general description with a separate first network node device D-PBE and separate second network node devices D1, D2.

Of the informed network node devices D1, D2, which receive the PBN message with the first Configuration Setup Session Identifier CSSID indicated by PBN(CSSID), again each network node device start a Push Button Configuration session (PBC session), e.g. a Wi-Fi Protected Setup session (WPS).

The new device (third network node device) ND that is to be registered with the network, to which the network node devices D-PBE, D1, D2 belong, starts the Push Button Configuration by the second Push Button Event PBE-2. A monitoring is performed according to the standard to detect overlapping PBC sessions.

Now both second network node devices D1, D2 indicate the status of their started PBC by sending messages over a wireless link, called as wireless messages WME. The first Configuration Setup Session Identifier CSSID is included in the wireless message WME. The wireless message WME could be a beacon message, a probe response message, an "Extensible Authentication Protocol over Local Area Network (EAPoL)"-message or a UPnP message, which each also refers to the network node device D1 respectively D2 and the started PBC.

The new device ND detects again two simultaneous Push Button Configuration sessions, i.e. a session overlap, but due to the fact that the first Configuration Setup Session Identifier CSSID, which is sent with wireless message WME each by the network node devices D1, D2 having different MAC addresses and including the same or a different Service Set Identifier "SSID" (network name), is the same (the new device ND verifies whether the CSSID value included in the message of the network node device D1 is identical to the CSSID value in the message of the network node device D2), the new device ND doesn't abort the PBC sessions. Instead of aborting the PBC sessions the new device ND is running a technology specific Push Button Configuration session, e.g. a WPS session, with one of the second network node devices D1, D2. According to the FIG. 10 and the selection of the second network node device D2 it runs the PBC session with the second network node device D2.

For identifying the first specific configuration setup session and to prove the ownership of the identifier CSSID after the completion of the technology specific Push Button Configuration session between the second network node device D2 and the third network node device ND the second network node device D2 requests via the second network node device D1 with a request "Pre-CSSID" the value R from the first network node device D-PBE. As soon as the second network node device D2 receives via the same way the requested value R from the first network node device D-PBE the second network node device D2 transmits after a cryptographic key has been established during the run of the technology specific Push Button Configuration session the value R via an encrypted communication protected by the cryptographic key to the third network node device ND, which verifies the cryptographic commitment value H(R) respectively the first configuration setup session identifier CSSID.

In the case the second network node device D1 had been selected by the third network node device ND the second network node device D1 requests with a request "Pre-CSSID" the value R directly from the first network node device D-PBE. As soon as the second network node device D1 receives via the same way the requested value R from the first network node device D-PBE the second network node device D1 transmits after a cryptographic key has been established during the run of the technology specific Push Button Configuration session the value R via an encrypted communication protected by the cryptographic key to the third network node device ND, which verifies the cryptographic commitment value H(R) respectively the first configuration setup session identifier CSSID.

By using the first configuration setup session identifier CSSID the third network node device ND can prove the "ownership" of the first configuration setup session identifier CSSID after the push button configuration session setup is completed. This can be done be using the cryptographic commitment value H(R) as the first configuration setup session identifier CSSID. The third network node device ND stores the CSSID value, and verifies it after the PBC protocol has finished resp. at a final message exchange part of the PBC protocol.

Only after the cryptographic commitment value H(R) has been established by the PBC protocol (WSC), the authorized usage of the CSSID value has to be committed by revealing the value R to the new device ND that has been used to determine the CSSID. The value of R is sent to the new device ND over the encrypted communication protected by the newly established key. This ensures that the value R is received only by the new device ND.

Here, not the CSSID value itself is generated randomly, but a pre-CSSID value R is generated randomly. So the value R can also be considered as cryptographic nonce value. From the value R, a value is derived using a one-way function H (e.g., SHA-1, SHA-256, SHA-3). This derived value is used as CSSID:

CSSID:=H(R)

It is also possible to use a keyed one-way function HMAC (e.g., HMAC-SHA1, HMAC-SHA256, HMAC-SHA3) where the value R is used as key and a fixed textual string is used to designate the purpose:

CSSID:=HMAC(R, "CSSID-Derivation")

In another variant, it is possible to include further parameters in the derivation of CSSID (e.g., the network name SSID, the MAC address of the Registrar/the first network node device D-PBE, the used frequency band and modulation scheme). This information is preferably encoded as text string or as byte string and concatenated with the purpose string ("CSSID-Derivation").

The value R is stored by the first network node device D-PBE. It is distributed to that network node device of the home network that is running the PBC protocol (in the example according to the FIG. 10 it is the second network node device D2). At the end of or after the PBC protocol, the value R is revealed by the second network node device D2 to the third network node device ND over the cryptographically protected communication link established between the second network node device D2 and the third network node device ND. For the cryptographic protection of the link, either the session WPC key (Diffie-Hellman) as defined by WSC is used, or already the key established by the WSC PBC session (or a key derived from one of these keys). The third network node device ND verifies whether the equation R==H(CSSID) holds. The symbol ==designates equality. If this equation holds, the usage of CSSID value is verified as valid. Thereby the third network node device ND has verified that it has been running the WSC/PBC protocol with a node that legitimately used the CSSID value. If this is the case, the third network node device ND accepts the configuration established by the WSC/PBC protocol run as valid.

In an extension, there is a specific authorized time period for providing R. The configuration is accepted by the third network node device ND only if the value R is received within the authorized time period (depending, for instance, on the point in time of the push button event of the third network node device ND).

The value R may be included in particular in an M8 message of the Wi-Fi Simple Configuration Technical Specification v2.0.2 [2] or later that is extended with the R parameter.

In the variant shown in FIG. 10, the second network node device D2 running the PBC protocol requests the pre-CSSID value R from the first network node device D-PBE. After verifying that the request originates from a node being part of the home network, the value R is provided. Different options for providing the value R within the home network may be used. For example, the first network node device D-PBE may provide the value R as part of a broadcast message sent to all nodes of the home network, or as part of a multicast message or any cast message. One embodiment is to provide the value R with a unicast message sent from the first network node device D-PBE to the second network node device D2, the requestor of the Pre-CSSID value R. Note: The request and the distribution of the pre-CSSID value R can be potentially over multiple hops in the home network. In the example shown in FIG. 10, it is assumed that the actual messages containing the request for the pre-CSSID value R and the messages containing the pre-CSSID value R are over multiple hops with the second network node device D1 being an intermediate node. (Request message are sent from D2 to D1, from D1 to D-PBE, messages containing R are sent from D-PBE to D1, from D1 to D2).

Instead of providing the value R directly to the second network node device D1 and/or the second network node device D2, the first network node device D-PBE may provide the value R to a separate Registrar of the home network. In a second step, the registrar of the home network provides the value R to the second network node device D1 and/or the second network node device D2. It is also possible that the value R is generated and stored by the separate Registrar.

Figure 11:
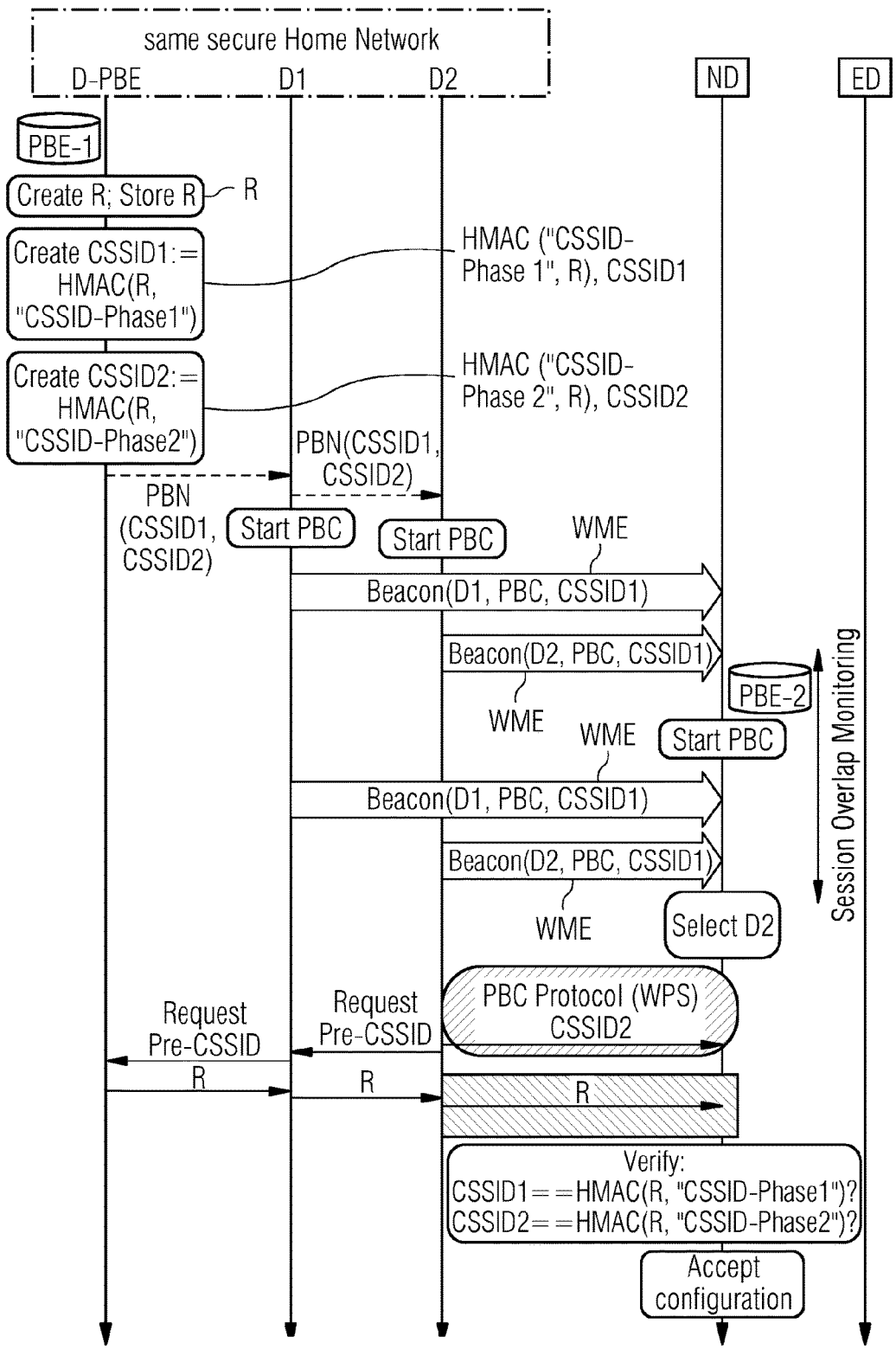

FIG. 11 shows based on the FIG. 8 a further modified message flow (signalling flow) with a successful registration of a new device despite reception of multiple PBC indications further improving the controlling of running technology specific Push Button Configuration sessions. All the general remarks made by describing the FIG. 8, unless they are not mentioned explicitly in the following description of the FIG. 11, are also valid for the description of the FIG. 11.

The improvement entails in that according to FIG. 10 two cryptographic commitment values, a first cryptographic commitment value HMAC("CSSID-Phase1", R) as a Primary-Identifier CSSID1 and a second cryptographic commitment value HMAC("CSSID-Phase2", R) as a Secondary-Identifier CSSID2 are used. The first cryptographic commitment value HMAC("CSSID-Phase1", R) respectively the Primary-Identifier CSSID1 Primary-Identifier (CSSID1) is used instead of the first configuration setup session identifier CSSID for identifying the first specific configuration setup session. The second cryptographic commitment value HMAC("CSSID-Phase2", R) respectively the Secondary-Identifier CSSID2 is used to prove the knowledge of the value R during the run of the technology specific Push Button Configuration session between the second network node device D2 and the third network node device ND. Instead of the "Hash based Message Authentication Code" (HMAC), a key derivation function or a message authentication code such as "Advanced Encryption Standard-Cyber Block Chaining-Message Authentication Code (AES-CBC-MAC)" may be used.

In a variant, also here there are specific time ranges for PBC protocol run and for providing the value R. The PBC protocol (WPS) succeeds only successfully when starting, e.g., from PBC trigger of PBC protocol run, when the expected information is exchanged during the envisaged period.

As in the FIG. 8 the two network node devices D1, D2 and the node device with the External Registrar functionality D-PBE belong to the same heterogeneous or homogeneous wireless network, e.g., an IEEE P1905.1 network or a single WLAN mesh network according to IEEE 802.11. Although again only these three network node devices D1, D2, D-PBE are shown in the FIG. 10 it should be clear that the network can include more than these three devices. This means that besides a first network node device, which corresponds to the node device with the External Registrar functionality D-PBE, the network can have at least one second network node device, in the present case two second network node devices D1, D2.

Again the Push Button Configuration (initiation of an automatic security bootstrapping) is started, here by the first Push Button Event PBE-1 triggered on the first network node device D-PBE. The push button may be again a physical push button activated by a user, a software push button on a user interface activated by a human user, or a logical push button which can be activated, for instance, by a software program. The first network node device D-PBE may again in particular realize the role of a Registrar according to Wi-Fi Protected Setup specification.

The first network node device D-PBE creates from the value R, the configuration setup session identifier for a phase 1 CSSID-Phase1 and the configuration setup session identifier for a phase 2 CSSID-Phase2 based on a "Hash based Message Authentication Code" HMAC the first cryptographic commitment value HMAC("CSSID-Phase1", R) as the Primary-Identifier CSSID1, which is used instead of the first configuration setup session identifier CSSID for identifying the first specific configuration setup session, and the second cryptographic commitment value HMAC("CSSID-Phase2", R) as the Secondary-Identifier CSSID2, which is used to prove the knowledge of the value R during the run of the technology specific Push Button Configuration session between the second network node device D2 and the third network node device ND.

The value R is preferably generated randomly or pseudo-randomly, when the configuration setup session is initiated by pressing a button for a Push Button Configuration.

The second network node device D2 belonging to the same network is informed by the first network node device D-PBE by sending the push button notification message PBN to the second network node device D2. The push button notification message PBN transports the created Primary-Identifier CSSID1. Of the network node devices D1, D2 again each network node device start a Push Button Configuration session (PBC session), e.g. a Wi-Fi Protected Setup session (WPS).

The new device (third network node device) ND that is to be registered with the network, to which the network node devices D1 and D2 belong, starts also the Push Button Configuration by the second Push Button Event PBE-2. A monitoring is performed according to the standard to detect overlapping PBC sessions.

Now both network node devices D1 and D2 indicate the status of their started PBC by sending messages over a wireless link, called as wireless messages WME. The created Primary-Identifier CSSID1 is included in the wireless message WME. The wireless message WME could be a beacon message, a probe response message, an "Extensible Authentication Protocol over Local Area Network (EAPoL)"-message or a UPnP message, which each also refers to the network node device D1 respectively D2 and the started PBC.

The new device ND detects again two simultaneous Push Button Configuration sessions, i.e. a session overlap, but due to the fact that the first Configuration Setup Session Identifier CSSID, which is sent with wireless message WME each by the network node devices D1, D2 having different MAC addresses and including the same or a different Service Set Identifier "SSID" (network name), is the same (the new device ND verifies whether the CSSID value included in the message of the network node device D1 is identical to the CSSID value in the message of the network node device D2), the new device ND doesn't abort the PBC sessions. Instead of this it is running a technology specific Push Button Configuration session, e.g. a WPS session, with one of the network node devices D1, D2. According to the FIG. 11 and the selection of the second network node device D2 it runs the PBC session with the second network node device D2. During this PBS session (PBS Protocol (WPS)) the Secondary-Identifier CSSID2 is transmitted from first network node device D1 to the new device ND.

For identifying the first specific configuration setup session and to prove the ownership of the identifier CSSID after the completion of the technology specific Push Button Configuration session between the second network node device D2 and the third network node device ND the second network node device D2 requests via the second network node device D1 with a request "Pre-CSSID" the value R from the first network node device D-PBE. As soon as the second network node device D2 receives via the same way the requested value R from the first network node device D-PBE the second network node device D2 transmits after a cryptographic key has been established during the run of the technology specific Push Button Configuration session the value R via an encrypted communication protected by the cryptographic key to the third network node device ND, which verifies the cryptographic commitment values respectively the Primary-Identifier CSSID1 and the Secondary-Identifier CSSID2.

In the case the second network node device D1 had been selected by the third network node device ND the second network node device D1 requests with a request "Pre-CSSID" the value R directly from the first network node device D-PBE. As soon as the second network node device D1 receives via the same way the requested value R from the first network node device D-PBE the second network node device D1 transmits after a cryptographic key has been established during the run of the technology specific Push Button Configuration session the value R via an encrypted communication protected by the cryptographic key to the third network node device ND, which verifies the cryptographic commitment values respectively the Primary-Identifier CSSID1 and the Secondary-Identifier CSSID2.

According to the embodiment shown in the FIG. 11, the Primary-Identifier CSSID1 and the Secondary-Identifier CSSID2 are used. The Primary-Identifier CSSID1 is used as above, while the additional Secondary-Identifier CSSID2 is used during the PBC protocol run. The value of CSSID2 is provided during the PBC protocol run, protected cryptographically with key material established by the PBC protocol run. The two values of CSSID1 and CSSID2 may be provided within a single message (as before the CSSID value). It is also possible to use two separate messages, one including the Primary-Identifier CSSID1, and one including the Secondary-Identifier CSSID2.

The pre-CSSID value R is generated by the first network node device D-PBE as before randomly, and it is stored by the first network node device D-PBE. The values CSSID1 and CSSID2 can be determined using a keyed one-way function/keyed hash function (e.g., HMAC-SHA1-HMAC-SHA2, HMAC-SHA3; Instead of HMAC, also a key derivation function or a message authentication code as AES-CBC-MAC may be used.), using the value R as key and a textual string as purpose identifier:
CSSID1:=HMAC(R, "CSSID-Phase1")
CSSID2:=HMAC(R, "CSSID-Phase2")

In a variant, it is possible to include further parameters in the derivation of CSSID1 and/or CSSID2 (e.g., the network name SSID, the MAC address of the Registrar/the first network node device D-PBE, the used frequency band and modulation scheme. This information is preferably encoded as text string or as byte string and concatenated with the purpose string ("CSSID-Phase1", "CSSID-Phase2").

The new device ND verifies, similar as before, whether the following equations hold, i.e. whether the received values for CSSID1 and CSSID2 are equal to the locally computed reference values depending on the received value R and a fixed textual string indicating the purpose within the keyed one-way function HMAC (the symbol=designates equality):
CSSID1==HMAC(R, "CSSID-Phase1")
CSSID2==HMAC(R, "CSSID-Phase2")

Figure 2:
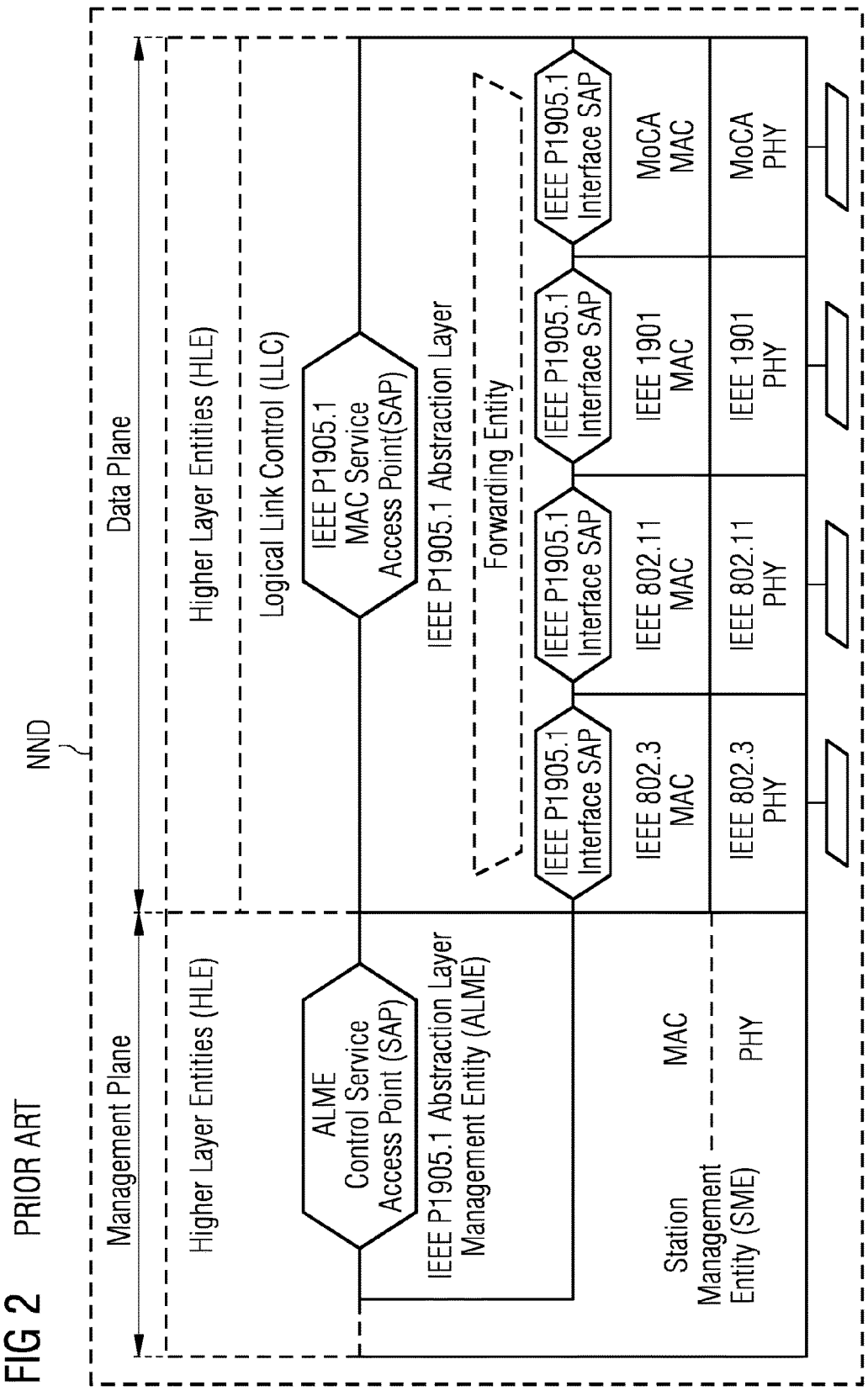
FIG. 2 shows the design of the abstraction layer based on the ISO/OSI-Reference Model with a management and data plane.
Figure 3:
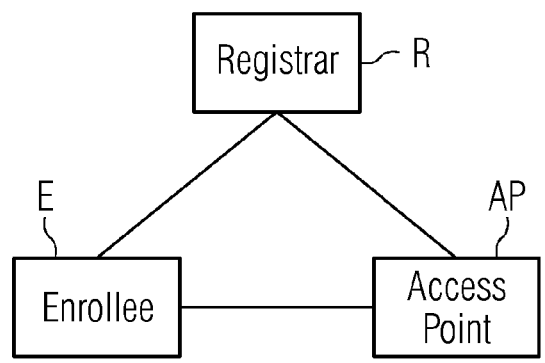
FIG. 3 illustrates the components involved in a Push Button Configuration as defined by the Wi-Fi Simple Configuration Protocol [2]: A Registrar R, an Access Point AP, and an Enrollee E.
Figure 4:
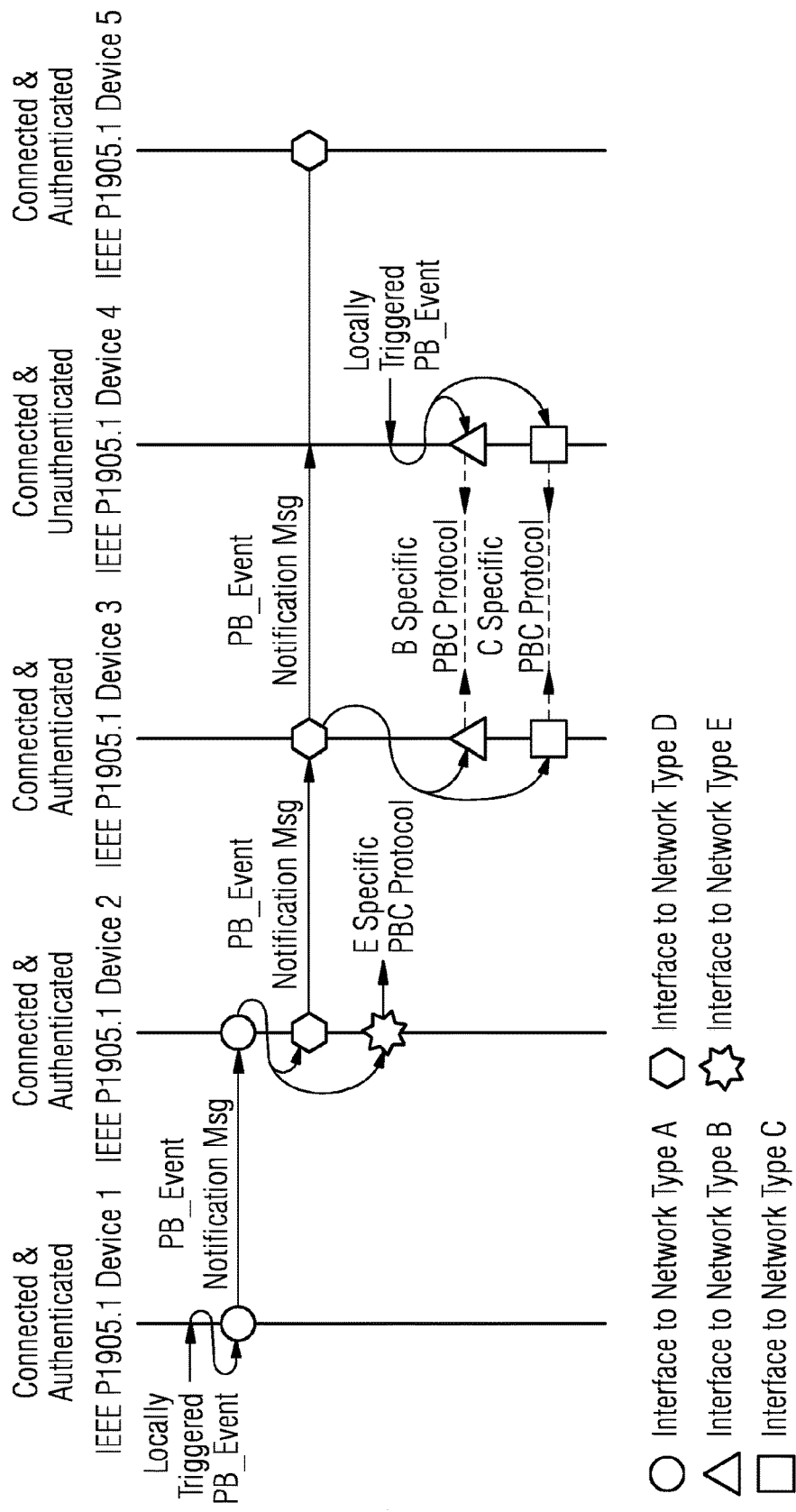
FIG. 4 shows an example of the IEEE 1905.1 Push Button Configuration (PBC) Method for automatic cross-technology security setup (multi-technology push button configuration) in clause 9.2.2.
Figure 12:
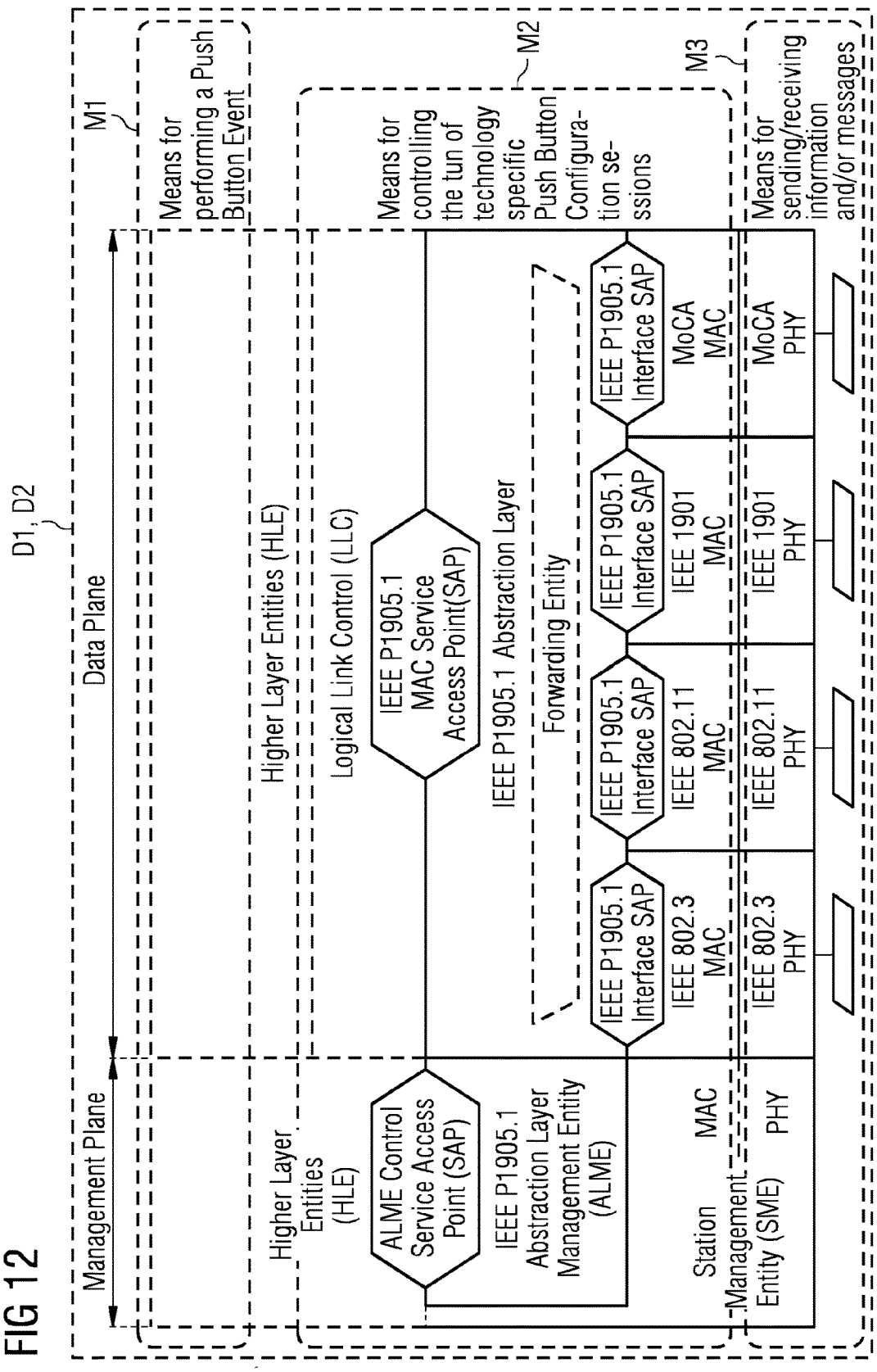

FIG. 12 shows the structure of the network node device D1, D2, especially the first network node device D1, each with at least one interface for controlling the run of technology specific Push Button Configuration sessions within a heterogeneous or homogeneous wireless network based on the abstraction layer embedded in the IEEE P1905.1-Architecture above the Media Access Control (MAC)-layer and the Physical layer according to FIG. 2. According to FIG. 12 the network node device D2, respectively the first network node device D1 comprise in contrast to the network node device NND of FIG. 2 dedicated means namely means for performing a Push Button Event (PBE) M1, means for controlling the run of technology specific Push Button Configuration sessions M2 and means for sending/receiving information and/or messages M3. While the means M3 include or incorporate all entities of the IEEE P1905.1-Architecture belonging to the Physical Layer and the means M1 include respectively incorporate the entities of the IEEE P1905.1-Architecture belonging to the Application Layer entities, which are part of the Higher Layer Entities (HLE), the means for controlling the run of technology specific Push Button Configuration sessions M2 include respectively incorporate all entities in the data- and management plane of the IEEE P1905.1-Architecture from the MAC-Layer including the Abstraction Layer with the IEEE P1905.1 Abstraction Management Entity (ALME) and the corresponding Service Access Points (SAP) via the Logical Link Control (LLC) up to the Higher Layers with its most entities.

REFERENCES

[1] IEEE Standard for a Convergent Digital Home Network for Heterogeneous Technologies, IEEE Std 1905.1-2013, Apr. 2013
[2] Wi-Fi Simple Configuration Technical Specification Version 2.0.2, Wi-Fi Alliance, January 2012

What is claimed is:
1. A method for controlling an execution of technology specific Push Button Configuration sessions within a heterogeneous or homogeneous wireless network and a plurality of network node devices interconnected to each other via at least one interface and/or over multiple hops and authenticated or unauthenticated for the network, the method comprising:
(a) triggering an authenticated first network node device by a first virtual or physical Push Button Event assigned to the first network node device to directly or indirectly send a notification message notifying about the first Push Button Event to at least two second network node devices, (b) starting, by each of the at least two second network node devices, a Push Button Configuration session, (c) triggering an unauthenticated third network node device by a second virtual or physical Push Button Event assigned to the third network node device to start a technology specific Push Button Configuration session, (d) creating, by the first network node device, a first configuration setup session identifier for identifying a first specific configuration setup session, which first configuration setup session identifier is transmitted by the notification message to each of the at least two second network node devices, (e) during the started Push Button Configuration session, each of the at least two second network node devices sending the received first configuration setup session identifier to the third network node device via a respective wireless message, and (f) determining, by the third network node device, that the first configuration setup session identifier received from each of the at least two second network node devices is the same identifier, and as a result of such determination, executing, by the third network node device, the technology specific Push Button Configuration session with at least one second network node device to thereby register the third network node device with the wireless network.

2. A method for controlling an execution of technology specific Push Button Configuration sessions within a heterogeneous or homogeneous wireless network and a plurality of network node devices interconnected to each other via at least one interface and/or over multiple hops and authenticated or unauthenticated for the network, the method comprising:

(a) triggering an authenticated first network node device by a first virtual or physical Push Button Event assigned to the first network node device to directly or indirectly send a notification message notifying about the first Push Button Event to at least one authenticated second network node device, (b) starting, by the at least one second network node device, a Push Button Configuration session, (c) triggering an unauthenticated third network node device by a second virtual or physical Push Button Event assigned to the third network node device to start a technology specific Push Button Configuration session, (d) triggering an external device that is not part of the network by a third virtual or physical Push Button Event assigned to the via at least one wireless message external device to start a Push Button Configuration session, (e) creating, by the first network node device, a first configuration setup session identifier for identifying a first specific configuration setup session, which is transmitted by the notification message to the at least one second network node device, (f) creating, by the external device, a second configuration setup session identifier for identifying a second specific configuration setup session, (g) during the started Push Button Configuration session, the at least one second network node device sending the received first configuration setup session identifier to the third network node device via at least one wireless message, (h) during the started Push Button Configuration session, the external device sending the second configuration setup session identifier to the third network node device via at least one wireless message, and (i) determining, by the third network node device, a difference between the first and second configuration setup session identifier, and as a result of such determination, detecting a session overlap and aborting the technology specific Push Button Configuration and technology specific Push Button Configuration session with at least one second network node device and the external device.

3. The method of claim 1, wherein the first network node device:

creates from a value a cryptographic commitment value as the first configuration setup session identifier for identifying the first specific configuration setup session and to prove the ownership of the identifier after the completion of the technology specific Push Button Configuration session between the at least one second network node device and the third network node device, and receives a request for the value directly or indirectly from the at least one second network node device establishing a cryptographic key during the execution of the technology specific Push Button Configuration session with the third network node device , transmits the requested value directly or indirectly to the third network node device via an encrypted communication protected by the cryptographic key and via the at least one second network node device executing the technology specific Push Button Configuration session with the third network node device, wherein the third network node device verifies the cryptographic commitment value with the first configuration setup session identifier.

4. The method of claim 1, wherein the first network node device:

creates, based on (a) a value, (b) a configuration setup session identifier for a phase 1 and (c) a configuration setup session identifier for a phase 2 based on a "Hash based Message Authentication Code," a key derivation function, or a "Advanced Encryption Standard-Cyber Block Chaining-Message Authentication Code":

a first cryptographic commitment value as a Primary-Identifier, which is used instead of the first configuration setup session identifier for identifying the first specific configuration setup session, and a second cryptographic commitment value as a Secondary-Identifier, which is used to prove knowledge of the value during the execution of the technology specific Push Button Configuration session between the at least one second network node device and the third network node device, receives a request for the value directly or indirectly from the at least one second network node device establishing a cryptographic key during the execution of the technology specific Push Button Configuration session with the third network node device, transmits the requested value directly or indirectly to the third network node device via an encrypted communication protected by the cryptographic key and via the at least one second network node device executing the technology specific Push Button Configuration session with the third network node device, wherein the third network node device verifies the cryptographic commitment values with the Primary-Identifier and the Secondary-Identifier.

5. The method of claim 1, wherein the heterogeneous network is a Convergent Digital Home Network based on the IEEE 1905.1 standardization specification, and wherein the homogeneous network is WLAN/Wi-Fi network based on the IEEE 802.11 standardization specification.

6. The method of claim 1, wherein the first and second configuration setup session identifiers are generated randomly or pseudo-randomly when the technology specific Push Button Configuration is initiated.

7. The method of claim 1, wherein the first and second configuration setup session identifiers are calculated using a cryptographic hash function as the Message Digest Algorithm "MD5" or the Secure Hash Algorithms "SHA-1"; "SHA-256", using one or more derivation parameters including at least one of the Basic Service Set Identifier "BSSID" or the client MAC Service Set Identifier "SSID".

8. The method of claim 1, wherein the first and second configuration setup session identifiers are identical to or derived from an IEEE P1905.1 Push Button Event ID.

9. The method of claim 1, wherein the at least one wireless message comprises at least one of a beacon message, a probe response message, an "Extensible Authentication Protocol over Local Area Network"-message, or an UPnP message, and includes an information element or data field for transporting at least one of the values or identifiers.

10. A first network node device for controlling an execution of configuration setup sessions within a heterogeneous or homogeneous wireless network, with a plurality of other network node devices authenticated or unauthenticated for the network, including at least two authenticated second network node devices and an unauthenticated third network node device triggered by a virtual or physical Push Button Event assigned to the third network node device to start a technology specific Push Button Configuration session, interconnected to each other via at least one interface and/or over multiple hops, the first network node device being authenticated for the network and comprising:

(a) a wireless transmitter device programmed to send/receive information and/or messages triggered by a unit that performs a Push Button-Event, the wireless transmitter device programmed to send a notification message notifying about a further virtual or physical Push Button Event directly or indirectly to each of the at least two authenticated second network node devices, wherein each authenticated second network node device subsequently starts Push Button Configuration session, and (b) a control unit including software stored in non-transitory computer-readable media and executable by a processor to control the execution of configuration setup sessions, the control unit being connected with the wireless transmitter device and programmed to create a configuration setup session identifier for identifying a first specific configuration setup session, which is transmitted by the notification message to each of the at least two authenticated second network node devices.

11. The first network node device of claim 10, wherein:
the control unit is programmed to create, from a value, a cryptographic commitment value as the first configuration setup session identifier for identifying the first specific configuration setup session and to prove ownership of the identifier after completion of the technology specific Push Button Configuration session between at least one network node device and the third network node device,
the wireless transmitter device is programmed to:
receive a request for the value directly or indirectly from the at least one second network node device establishing a cryptographic key during the execution of the technology specific Push Button Configuration session with the third network node device,
transmit the request value directly or indirectly to the third network node device via an encrypted communication protected by the cryptographic key and via the at least one second network node device executing the technology specific Push Button Configuration session with the third network node device, wherein the third network node device verifies the cryptographic commitment value with the first configuration setup session identifier.

12. The first network node device of claim 10, wherein:
the control unit is programmed to create, from (a) a value, (b) the configuration setup session identifier for a phase 1, and (c) the configuration setup session identifier for a phase 2 based on a "Hash based Message Authentication Code", a key derivation function, or a "Advanced Encryption Standard-Cyber Block Chaining-Message Authentication Code":
a first cryptographic commitment value as a Primary-Identifier, which is used instead of the first configuration setup session identifier for identifying the first specific configuration setup session, and
a second cryptographic commitment value as a Secondary-Identifier, which is used to prove the knowledge of the value during the execution of the technology specific Push Button Configuration session between the at least one second network node device and the third network node device,
the wireless transmitter device is programmed to:
receive a request for the value directly or indirectly from the at least one second network node device establishing a cryptographic key during the execution of the technology specific Push Button Configuration session with the third network node device,
transmit the requested value directly or indirectly to the third network node device via an encrypted communication protected by the cryptographic key and via the at least one second network node device executing the technology specific Push Button Configuration session with the third network node device, wherein the third network node device verifies the cryptographic commitment values with the Primary-Identifier and the Secondary-Identifier.

13. The first network node device of claim 10, wherein the heterogeneous network is a Convergent Digital Home Network based on the IEEE 1905.1 standardization specification, and wherein the homogeneous network is WLAN/Wi-Fi network based on the IEEE 802.11 standardization specification.

14. The first network node device of claim 10, wherein the first and second configuration setup session identifiers are generated randomly or pseudo-randomly when the technology specific Push Button Configuration is initiated.

15. The first network node device of claim 10, wherein the first and second configuration setup session identifiers are calculated using a cryptographic hash function as the Message Digest Algorithm "MD5" or the Secure Hash Algorithms "SHA-1"; "SHA-256", using one or more derivation parameters including at least one of the Basic Service Set Identifier "BSSID" or the client MAC Service Set Identifier "SSID".

16. The first network node device of claim 10, wherein the first and second configuration setup session identifiers are identical to or derived from an IEEE P1905.1 Push Button Event ID.

17. A second network node device for controlling an execution of technology specific Push Button Configuration sessions of at least one second network node device within a heterogeneous or homogeneous wireless network, with a plurality of further network node devices authenticated or unauthenticated for the network, including an authenticated first network device and an unauthenticated third network node device triggered by a virtual or physical Push Button Event assigned to the third network node device to start a technology specific Push Button Configuration session, interconnected to each other via at least one interface and/or over multiple hops, the second network node device being authenticated for the network and comprising:
  (a) a wireless transmitter device programmed to send/receive information and/or messages receive directly or indirectly from the first network node device a notification message notifying about a further virtual or physical Push Button Event and a configuration setup session identifier, and
  (b) a control unit including software stored in non-transitory computer-readable media and executable by a processor to control the execution of technology specific Push Button Configuration sessions, wherein the control unit is connected with the communications unit and programmed to:
    (b1) start a Push Button Configuration session, and
    (b2) during the started Push Button Configuration session, send the received configuration setup session identifier to the third network node device via at least one wireless message, to thereby enable the third network node device to determine that the configuration setup session identifier received from the second network node device matches a further configuration setup session identifier received from another network node device and, as a result of such determination, execute the technology specific Push Button Configuration session with the at least one second network node device.

18. A second network node device for controlling an execution of technology specific Push Button Configuration sessions within a heterogeneous or homogeneous wireless network, with a plurality of further network node devices authenticated or unauthenticated for the network or not part of the network, including an authenticated first network device, an unauthenticated third network node device triggered by a virtual or physical Push Button Event assigned to the third network node device to start a technology specific Push Button Configuration session and an unauthenticated external device not being part of the network triggered also by a virtual or physical Push Button Event assigned to the external device to start a Push Button Configuration session the external device, creating a first configuration setup session identifier for identifying a specific configuration setup session and sending within the started Push Button Configuration session the created first configuration setup session identifier via at least one wireless message to the third network node device, interconnected to each other via at least one interface and/or over multiple hops, the second network node device being authenticated for the network and comprising:
  (a) a wireless transmitter device programmed to send/receive information and/or messages, the wireless transmitter device programmed to receive a notification message notifying about a further virtual or physical Push Button Event directly or indirectly from the first network node device, and
  (b) a control unit including software stored in non-transitory computer-readable media and executable by a processor to control the execution of technology specific Push Button Configuration sessions, wherein the control unit is connected with the communications unit and programmed to:
    (b1) start a Push Button Configuration session,
    (b2) during the started Push Button Configuration session, send the received configuration setup session identifier to the third network node device via at least one wireless message, to enable the third network node device to detect a session overlap as a result of determining that the first configuration setup session identifier does not match a further configuration setup session identifier received at the third network node and identifying a further specific configuration setup session, and in response to detecting the session overlap based on the non-matching configuration setup session identifiers, to abort the technology specific Push Button Configuration and technology specific Push Button Configuration session with the second network node device and the external device.

19. The second network node device of claim 17, wherein the heterogeneous network is a Convergent Digital Home Network based on the IEEE 1905.1 standardization specification, and wherein the homogeneous network is WLAN/Wi-Fi network based on the IEEE 802.11 standardization specification.

20. The second network node device of claim 17, wherein the at least one wireless message comprises at least one of a beacon message, a probe response message, an "Extensible Authentication Protocol over Local Area Network"-message, or a UPnP message, and includes an information element or data field for transporting at least one of the values or identifiers.

21. Computer-readable instructions stored in non-transitory computer storage media and executable by a processor for controlling an execution of technology specific Push Button Configuration sessions within a heterogeneous or homogeneous wireless network with a plurality of network node devices interconnected to each other via at least one interface and/or over multiple hops and authenticated or unauthenticated for the network,
  wherein the computer-readable instructions are implemented in a first network node device and/or the network node device,
  wherein the computer-readable instructions are executable by the processor to perform a method for executing the technology specific Push Button Configuration sessions within a heterogeneous or homogeneous wireless network with a plurality of network node devices interconnected to each other via at least one interface and/or over multiple hops and authenticated or unauthenticated for the network, including:
    sending, via a wireless transmitter device, a notification message notifying about a virtual or physical Push Button Event directly or indirectly to each of at least two authenticated second network node devices, wherein each authenticated second network node device subsequently starts a respective Push Button Configuration session, and creating and transmitting to each of the at least two authenticated second network node devices a notification message including a first configuration setup session identifier for identifying a first specific configuration setup session, the first configuration setup session identifier being usable by a third network node device for detecting whether a session overlap exists.

22. A heterogeneous or homogeneous wireless network for controlling an execution of technology specific Push Button Configuration sessions comprising a first network node device, at least two second network node devices, and a plurality of other network node devices interconnected to each other via at least one interface and/or over multiple hops and authenticated or unauthenticated for the network, whereby the network performs a method for controlling the execution of technology specific Push Button Configuration sessions comprising:
  (a) triggering an authenticated first network node device by a first virtual or physical Push Button Event assigned to the first network node device to directly or indirectly send a notification message notifying about the first Push Button Event to the at least two second network node devices,
  (b) starting, by each of the at least two second network node devices, a Push Button Configuration session,
  (c) triggering an unauthenticated third network node device by a second virtual or physical Push Button Event assigned to the third network node device to start a technology specific Push Button Configuration session,
  (d) creating , by the first network node device, a first configuration setup session identifier for identifying a first specific configuration setup session, which first configuration setup session identifier is transmitted by the notification message to each of the at least two second network node devices,
  (e) during the started Push Button Configuration session, each of the at least two second network node devices sending the received first configuration setup session identifier to the third network node device via a respective wireless message, and
  (f) determining, by the third network node device, that the first configuration setup session identifier received from each of the at least two second network node devices is the same identifier, and as a result of such determination, executing, by the third network node device, the technology specific Push Button Configuration session with at least one second network node device.

* * * * *